United States Patent
Takahashi et al.

(10) Patent No.: US 7,506,195 B2
(45) Date of Patent: Mar. 17, 2009

(54) OPERATION MANAGEMENT METHOD AND OPERATION MANAGEMENT SERVER

(75) Inventors: Daisaku Takahashi, Kawasaki (JP); Yukiko Yoshii, Kawasaki (JP); Yoshiaki Kaku, Sapporo (JP); Hitoshi Ono, Kawasaki (JP); Hiroshi Suzuki, Kawasaki (JP); Chiaki Kawashima, Kawasaki (JP)

(73) Assignee: Fujitsu Limited, Kawasaki-Shi, Kanagawa (JP)

( * ) Notice: Subject to any disclaimer, the term of this patent is extended or adjusted under 35 U.S.C. 154(b) by 361 days.

(21) Appl. No.: 11/044,227

(22) Filed: Jan. 28, 2005

(65) Prior Publication Data

US 2005/0172162 A1    Aug. 4, 2005

Related U.S. Application Data

(63) Continuation of application No. PCT/JP02/13719, filed on Dec. 26, 2002.

(51) Int. Cl.
*G06F 11/00* (2006.01)

(52) U.S. Cl. .......................................... 714/4; 707/202

(58) Field of Classification Search ........................ None
See application file for complete search history.

(56) References Cited

U.S. PATENT DOCUMENTS

| | | | |
|---|---|---|---|
| 5,768,501 A * | 6/1998 | Lewis | 714/48 |
| 6,125,390 A | 9/2000 | Touboul | |
| 6,604,208 B1 * | 8/2003 | Gosselin et al. | 714/4 |
| 2002/0111755 A1 | 8/2002 | Valadarsky et al. | |
| 2004/0153693 A1 * | 8/2004 | Fisher et al. | 714/4 |

FOREIGN PATENT DOCUMENTS

| | | |
|---|---|---|
| JP | 11-232145 | 8/1999 |
| JP | 11-308222 | 11/1999 |
| JP | 2001-256032 | 9/2001 |
| JP | 2002-342182 | 11/2002 |

OTHER PUBLICATIONS

Japanese Patent Office Action issued on Apr. 3, 2007 in corresponding Japanese Patent Application No. 2004-564435.
Patent Abstracts of Japan, Publication No. 06-284126, Published Oct. 7, 1994.
Patent Abstracts of Japan, Publication No. 07-021055, Published Jan. 24, 1995.
Patent Abstracts of Japan, Publication No. 10-105440, Published Apr. 24, 1998.

(Continued)

*Primary Examiner*—Christopher S McCarthy
(74) *Attorney, Agent, or Firm*—Fujitsu Patent Center

(57) ABSTRACT

A method is provided to point out which software program is causing a problem. Event records are collected from target objects being monitored. An event group is then produced by grouping the collected event records. The event group is compared with a plurality of pattern definition groups in terms of occurrence patterns of event records, where each pattern definition group defines a pattern of event records that would be produced upon occurrence of a particular problem. Subsequently a troubleshooting record is extracted. This troubleshooting record has previously been associated with a pattern definition group resembling the event group in terms of occurrence patterns of event records.

11 Claims, 38 Drawing Sheets

OTHER PUBLICATIONS

Patent Abstracts of Japan, Publication No. 11-308222, Published Nov. 5, 1999.
Patent Abstracts of Japan, Publication No. 2001-256032, Published Sep. 21, 2001.
Patent Abstracts of Japan, Publication No. 2001-257677, Published Sep. 21, 2001.
Patent Abstracts of Japan, Publication No. 2002-342180, Published Nov. 29, 2002.
International Search Report dated Apr. 22, 2003 in corresponding Application PCT/JP2002/013719.
European Office Action dated Mar. 17, 2008 for corresponding European Patent Application No. 02793425.6-1225.
Japanese Office Action dated May 20, 2008 for corresponding Japanese Patent Application No. 2004-564435.

* cited by examiner

FIG. 6
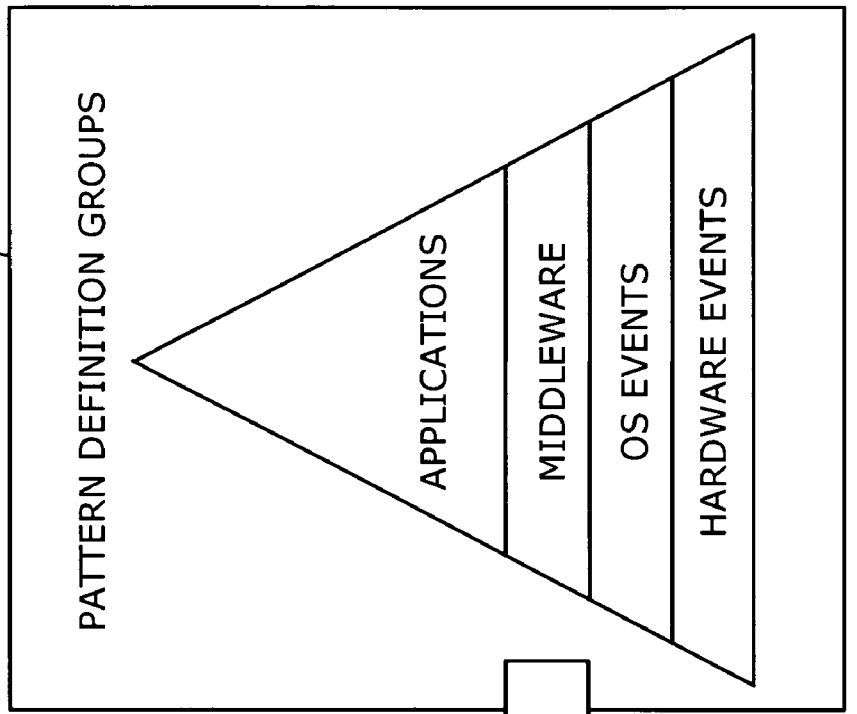
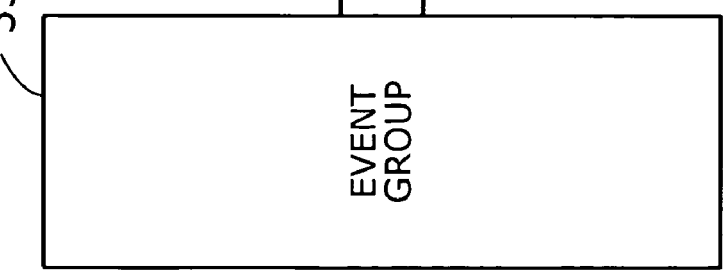

FIG. 7

33a EVENT GROUP

| ID | SERIAL NO. | TIME | HOST NAME | HW/SW NAME | ERROR CODE |
|---|---|---|---|---|---|
| 000008 | 111312 | 10:58 | DB001 | MIDDLEWARE "C" | SFE-00001 |
| 000008 | 111313 | 10:58 | DB001 | APPLICATION "D" | 0192 |
| 000008 | 111314 | 10:59 | DB002 | APPLICATION "D" | 0194 |
| 000008 | 111315 | 10:59 | DB002 | APPLICATION "D" | 0600 |

22a PATTERN DEFINITION GROUP

| ID | HW/SW NAME | ERROR CODE |
|---|---|---|
| PT0007 | OS "A" | WARNING 999 |
| PT0007 | MIDDLEWARE "B" | qdb0134 |
| PT0007 | STRAGE | SCSI SK:6 |
| PT0008 | MIDDLEWARE "C" | SFE-00001 |
| PT0008 | APPLICATION "D" | 0192 |
| PT0008 | APPLICATION "D" | 0194 |
| PT0008 | APPLICATION "D" | 0600 |
| PT0009 | .. | .. |

23 COUNTERMEASURE TABLE

| ID | CAUSE | COUNTERMEASURE | URGENCY LEVEL |
|---|---|---|---|
| 000007 | Performance degradation due to aging of disk drives | Replace RAID disks. | 2 |
| 000008 | Cluster switchover due to disk failure | Reboot the system and execute database recovery procedure. | 2 |
| 000009 | .. | .. | .. |

123a HARDWARE CONFIGURATION DATA

| EQUIPMENT ID | SYSTEM NAME | HOST NAME | PRODUCT NAME | NUMBER OF CPUs | MEMORY CAPACITY | DISK CAPACITY | NUMBER OF LANs |
|---|---|---|---|---|---|---|---|
| PP0001 | BUSINESS MANAGEMENT | test-nad01 | SERVER#1 | 4 | 2048 MB | 40 GB | 3 |

123b SOFTWARE CONFIGURATION DATA

| EQUIPMENT ID | SOFTWARE CLASS | SOFTWARE NAME | VERSION NUMBER | REVISION NUMBER |
|---|---|---|---|---|
| PP0001 | OS | UNIX | V8.0 | Ver.1101 |
| PP0001 | MIDDLEWARE | I-STAGE | V5.1 | Ver.0908 |

FIG. 14

123c NETWORK CONFIGURATION DATA

| CUSTOMER CODE | EQUIPMENT ID | HOST NAME | IP | INTERFACE NAME | IP ADDRESS TYPE |
|---|---|---|---|---|---|
| U00001 | PP0001 | test-nad00 | 192.168.0.1 | NIC01 | V (Virtual) |
| U00001 | PP0001 | test-nad01 | 192.168.0.2 | NIC02 | R (Real) |
| U00001 | PP0001 | test-nad11 | 192.168.0.3 | NIC03 | R (Real) |

FIG. 15

123d  SYSTEM CONFIGURATION DATA

| CUSTOMER CODE | EQUIPMENT ID | RELATED HOST NAME | RELATED CLASS | RELATED SOFTWARE |
|---|---|---|---|---|
| U00001 | PP0001 | PP0002 | CLUSTER | SECURE CLUSTER |
| U00001 | PP0001 | PP0010 | NAD-WWW | I-STAGE |
| U00001 | PP0001 | PP0011 | NAD-WWW | I-STAGE |
| U00001 | PP0001 | PP0012 | NAD-WWW | I-STAGE |
| U00001 | PP0001 | PP1000 | ADMINISTRATION | S-walker |
| U00001 | PP0001 | PP9999 | INDEPENDENT | STRAGE |

FIG. 16

121 EVENT GROUPS

| EVENT GROUP ID | GROUP MEMBER SERIAL NUMBER | EVENT ID | CUSTOMER ID | EQUIP-MENT ID | INTERFACE NAME | OCCURRENCE TIME |
|---|---|---|---|---|---|---|
| 00000001 | 0001 | 6755132 | U001 | PP0001 | NIC01 | 2002/10/310 14:38:00 |
| 00000001 | 0002 | 6755133 | U001 | PP0001 | NIC01 | 2002/10/310 14:38:00 |
| 00000002 | 0001 | 6755134 | U001 | PP0002 | NIC01 | 2002/10/310 14:38:00 |
| 00000002 | 0002 | 6755135 | U001 | PP0002 | NIC01 | 2002/10/310 14:38:00 |
| 00000002 | 0003 | 6755136 | U001 | PP0002 | NIC01 | 2002/10/310 14:38:00 |
| ... | ... | ... | ... | ... | ... | ... |

| SOURCE CLASS | SOURCE SHORT NAME | FILTERING | MESSAGE |
|---|---|---|---|
| MIDDLEWARE | S-walker | 0 | Service level monitor found an item (Disk Time Ratio) exceeding threshold (9500) |
| OS | UNIX | 0 | Experiencing high disk access rates |
| MIDDLEWARE | S-walker | 0 | Bad community from localhost |
| MIDDLEWARE | S-walker | 0 | Unable to process a pdu from localhost.32799 |
| MIDDLEWARE | S-walker | 0 | Deleted from the agent table |
| ... | ... | ... | ... |

FIG. 19

124 EVENT PATTERN DATABASE

| EVENT PATTERN ID | EVENT SERIAL NUMBER | OBJECT CLASS | OBJECT SHORT NAME | ERROR MESSAGE |
|---|---|---|---|---|
| PT000011 | 0001 | MIDDLEWARE | S-walker | WARNING:999 |
| PT000011 | 0002 | OS | UNIX | ID:047568 |
| PT000011 | 0001 | HARDWARE | STRAGE | ASK:6 Disk Retry Over |
| PT000011 | 0002 | OS | UNIX | ID:468756 disk error |
| PT000011 | 0003 | MIDDLEWARE | STRAGE | td00136 Application timeout |

FIG. 21

151 DAILY EVENT LOG

| EVENT GROUP ID | MATCHING PROCESS TIMESTAMP | EVENT PATTERN ID | NUMBER OF EVENTS | HIT COUNT |
|---|---|---|---|---|
| 000000001 | 2002/10/31 14:49:13 | PT000011 | 4 | 2 |
| 000000001 | 2002/10/31 14:49:14 | PT000093 | 1 | 1 |
| 000000002 | 2002/10/31 14:45:02 | PT000012 | 6 | 3 |
| 000000002 | 2002/10/31 14:46:40 | PT000012 | 7 | 3 |

Event Maintenance

FILE(F) EDIT(E) VIEW(V) FAVORITES(A) TOOL(T) HELP(H)

BACK ▽ ⇨ ⊗ ⌂ ⟳ ⊙Find ✱Favorites ⟲History

Event Maintenance
Customer: Fujitsu
Description: You can edit event definitions found by Message search or Event search.
To start, select either option and press SEARCH button.

SEARCH [        ]  [        ]  RETURN

⦿ Search Messages

☑ Customer Name  ---Customer Name--- ▶ (Required)

☐ Start Time    Y 2002 ▶  M 01 ▶  D 01 ▶    H 01 ▶ : M 01 ▶

☐ End Time      Y 2002 ▶  M 01 ▶  D 01 ▶    H 01 ▶ : M 01 ▶

— 511

◯ Search Events

☐ Cause

☐ Countermeasure

— 512

Done                                          Intranet

| TIME | HOST NAME | MESSAGE |
|---|---|---|
| 2002/5/17 18:15 | arg-argst-ap00 | dbregmng[7108]:[ID766571 user.warning] 01 2001 024w No database environment setup file. "" |
| 2002/5/17 18:21 | pgs-pgs-bat01 | pgs:[ID 702911 local0.error] SSH::ERR:0010: JOBID=, STEP=STEP0010, PGID=IW1BS046, RTNC= |
| 2002/5/17 18:40 | pgs-pgs-bat01 | UX:MpTrfAgt:WARNING:999:Service Level Monitor indicates that a monitored item (Page faults per second) has exceeded its set threshold (1000). Current value=1419.000000, Object Identifier=OnlyInstance(TRAP agent:10.56.26.141 community.sdkRO generic:6 enterprise:aplNetMpTrfspecific:5 timestamp:0 varbind:((fujitsu.4.3.1 [2 22 0] Page faults per second)(fujitsu.4.31.2 [1 4 0] 1000)(fujitsu.4.31.3 [2 11 0] 1419.000000)(fujitsu.4.31.8 [2 12 0] OnlyInstance)(cnAutoResetKind.0 [1 1 0] 0)(cnAutoResetId.0[2 51 0] 04:1.56.26.14:OnlyInstance:Page faults per second)) 521 |
| 2002/5/17 19:15 | arg-argst-ap00 | dbregmng[13368]:[ID766571 user.warning] 01 2001 024w No database environment setup file. "" |
| 2002/5/17 19:55 | infab-comm-db01 | FSUNlnkexp:[ID533718 user.error] ERROR:[kokyaku]:FL10101:Server specification error - server(kokyaku) |
| 2002/5/17 19:56 | infab-comm-db01 | FSUNlnkexp:[ID890592 user.error] ERROR:[pgs-pgs-bat00]:FL10101:Server specification error - server(pgs-pgs-bat00) |
| 2002/5/17 19:57 | infab-comm-db01 | FSUNlnkexp:[ID603989 user.error] TO FIX:[infrab-comm-db00]:FL40017:[USAGE]lxdsplog -n work_server_name [-s work_name][-l output level][-d start_time-end_time] |
| 2002/5/17 20:15 | arg-argst-ap00 | dbregmng[7108]:[ID766571 user.warning] 01 2001 024w No database environment setup file. "" |
| 2002/5/17 20:15 | pgs-pgs-bat01 | pgs:[ID 702911 local0.error] SSH:IW1D0181:ERR:0010: JOBID=IW1D0181M1,STEP=STEP0010, PGID=IW1P0006, RTNC=16 |
| 2002/5/17 20:20 | pgs-pgs-ap00 | /usr/lib/snmpdx:[ID403788 daemon.error] Subagent died:MpTrfExAs PID=2021--deleted from the agent table |
| 2002/5/17 20:20 | howcs-howcs-sv02 | /usr/lib/snmpdx:[ID991955 daemon.error] Subagent died:MpTrfExAs PID=16647--deleted from the agent table |

Show Events (select by message) 530

Event Maintenance
Customer: F Telecom
Description: This page allows you to select, change, and register retrieved patterns.

[CHANGE] [ADD] [DELETE] [DELETE EVENT] [RETURN]

SELECTED MESSAGE

| TIME | SYSTEM NAME | SYSTEM NAME | MESSAGE (FORMATTED) | MESSAGE (ORIGINAL) |
|---|---|---|---|---|
| 2002/5/17 19:56 | eBACK COMMON | infrab-comm-db01 | UX:MpTrfAgt:WARNING:999 | FSUN··· |
| ... | ... | ... | ... | ... |

531 → MESSAGE (ORIGINAL) column

SEARCH CONDITION

| SELECT | EVENT ID | CAUSE | COUNTERMEASURE |
|---|---|---|---|
| ⦿ | J0058 | Shared buffer might have been exhausted, which could affect database operations. | Check usage of resources including shared buffers and determine whether rollback is possible. |
| | ... | ... | ... |

532

EVENT MESSAGES

| EVENT ID | MESSAGE (FORMATTED) |
|---|---|
| J0058 | UX:MpTrfAgt:WARNING:999 |
| J0058 | UX:MpTrfAgt:WARNING:999 |
| ... | ... |

533

620 OPERATION PATTERN DATABASE

| OPERATION PATTERN CODE | OPERATION PATTERN | SYMPTOM | CAUSE | COUNTERMEASURE |
|---|---|---|---|---|
| s00000001 | vi init.ora starup | Unable to start database management program | Database block size has been edited incorrectly. | Set correct database block size. |
| s00000002 | vi /etc/hosts mail | Email transmission using mail command returns a notice stating: "My unqualified host name (cscats01) unknown"; sleeping for retry". Users experience slow response, too. | With version 8.8.8 and later, sendmail needs FQDN in /etc./hosts; i.e., a complete domain name has to be set with no abbreviations. | Edit hosts file such that host name in /etc/hosts be followed by domain name. |

FIG. 38

OPERATION MANAGEMENT METHOD AND OPERATION MANAGEMENT SERVER

This application is a continuing application, filed under 35 U.S.C. §111(a), of International Application PCT/JP2002/013719, filed Dec. 26, 2002.

BACKGROUND OF THE INVENTION

1. Field of the Invention

The present invention relates to an operation management method, operation management server, and operation management program for managing the operation of target devices, as well as to a computer-readable storage medium storing that operation management program. More particularly, the present invention relates to an operation management method, operation management server, and operation management program which effectively work in troubleshooting a problem with target devices being managed, as well as to a computer-readable storage medium storing that operation management program.

2. Description of the Related Art

The prevalence of Internet access environments in recent years has led to the effort to enhance the reliability of systems. One method is to introduce functional redundancy to the system. With redundant design, a failure in some part of a system will not disrupt the entire operation. The system can still operate with other functions that are alive.

Generally speaking, a failure or other problem event occurred in a server is reported to some other device (e.g., operation management server) in the form of messages. In a redundant system, a problem in one function propagates to other related functions, thus causing more error messages to be transmitted. That is, when a server encounters a problem, that server is not necessarily the only server that produces an error message. Actually, other related servers would send error messages as well.

The presence of multiple senders of error messages makes it difficult to locate the real problem source. Conventionally this task is delegated to network-savvy engineers who can locate a problem based on his/her experiences. Some less-skilled engineers, however, consume a long time to restore the system. In the case of an enterprise network, a delay in its recovery would cause a significant effect on the business activities of that company. It has therefore been a demand for a network system that can recover from failure without depending on the skill of individual service engineers.

One proposed solution is to have a database that stores records of each network failure, together with a time-series of failure notification messages that are produced consequently. A failure can be located by examining messages actually sent from the network in comparison with the database records. The proposed device automatically finds the location of a failure and thus enables quick recovery of a network system. See, for example, Japanese Patent Application Publication No. 2001-257677 (FIG. 1).

The device disclosed in Japanese Patent Application Publication No. 2001-257677 (FIG. 1) is, however, directed to communication failure on a network. It discusses nothing about how to deal with problems that an application or other programs running on a server may encounter. The proposed device does not provide functions of investigating a problem from error messages produced from applications, middleware, or operating system (OS) on a server.

The existing techniques do not allow us to identify the real location of a server problem when it generates a plurality of messages. Suppose, for example, that an application on a server has stopped for some reason. In addition to the originating application itself, some other programs including middleware and OS modules may also issue error messages. Particularly in an environment where a plurality of servers operate cooperatively, some application on another server would produce an error message as well.

As seen from the above discussion, one problem on a multifunction computer system could affect various applications running on different servers, resulting in multiple error messages. While the original problem derives from a particular software program on a particular server, it is not easy to reach the real cause and location of an error by merely investigating the received messages individually.

Things are more complicated in multitask and/or multi-thread system environments. In those systems, a problem with memory management could lead to a performance degradation in an application, or could disrupt a middleware module used by an application, without an apparent reason, in spite of the fact that the application has nothing wrong with it. It is hard to find the cause of such a problem, since the real culprit of the problem resides not in the software program that is performing poorly, but in some other place.

SUMMARY OF THE INVENTION

In view of the foregoing, it is an object of the present invention to provide an operation management method, operation management server, and operation management program, as well as a computer-readable storage medium storing that program, that can point out which software program is causing a problem.

To accomplish the above object, the present invention provides an operation management method shown in FIG. 1. This method is designed to perform operation management tasks in the following way. First, event records are collected from a plurality of target objects being monitored (step ST1), where the target objects are a plurality of functions executed on the server. An event group is then produced by grouping the collected event records (step ST2). The event group is compared with a plurality of pattern definition groups in terms of occurrence patterns of event records (step ST3), where each pattern definition group defines a pattern of event records that would be produced upon occurrence of a particular problem. Subsequently a troubleshooting record is extracted (step ST4). The troubleshooting record has previously been associated with a pattern definition group resembling the event group in terms of occurrence patterns of event records, and it indicates which target object is considered a source of a problem.

With the above operation management method, event records produced by target objects are collected and combined into an event group. That event group is then compared with a plurality of pattern definition groups. When a pattern definition group resembling the event group in terms of occurrence patterns is found, a troubleshooting record that has previously been associated with the found pattern definition group is extracted. This troubleshooting record indicates which target object is considered a source of a problem.

Further, to accomplish the above object, there is provided an operation management method for managing a server. This method comprises the steps of: collecting records of commands entered to the server; producing an operation log by grouping the collected command records; comparing the operation log with a plurality of operation patterns in terms of input patterns of commands, the operation patterns each defining a command input pattern that could lead to a problem; and extracting a troubleshooting record that has previously been associated with the operation pattern resembling the operation log in terms of input patterns of commands, the troubleshooting record indicating which target object is considered a source of a problem.

With the above operation management method, records of commands entered to the server are collected and combined into an operation log. That operation log is then compared with a plurality of operation patterns. When a particular operation pattern resembling the history log in terms of input patterns is found, a troubleshooting record that has previously been associated with that operation pattern is extracted. This troubleshooting record indicates which target object is considered a source of a problem.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 6 schematically shows a matching process.

FIG. 7 shows an example of event group matching and countermeasure record retrieval.

FIG. 13 shows an example data structure of hardware configuration data.

FIG. 14 shows an example data structure of software configuration data.

FIG. 15 shows an example data structure of network configuration data.

FIG. 16 shows an example data structure of system configuration data.

FIG. 19 shows an example data structure of event groups.

FIG. 21 shows an example data structure of an event pattern database.

FIG. 22 shows an example data structure of a daily event log.

FIG. 34 shows an example of an event group search screen.

FIG. 35 shows an example of an event selection screen.

FIG. 36 shows an example of an analysis result screen.

FIG. 38 shows an example data structure of an operation pattern database.

DESCRIPTION OF THE PREFERRED EMBODIMENTS

Figure 1:
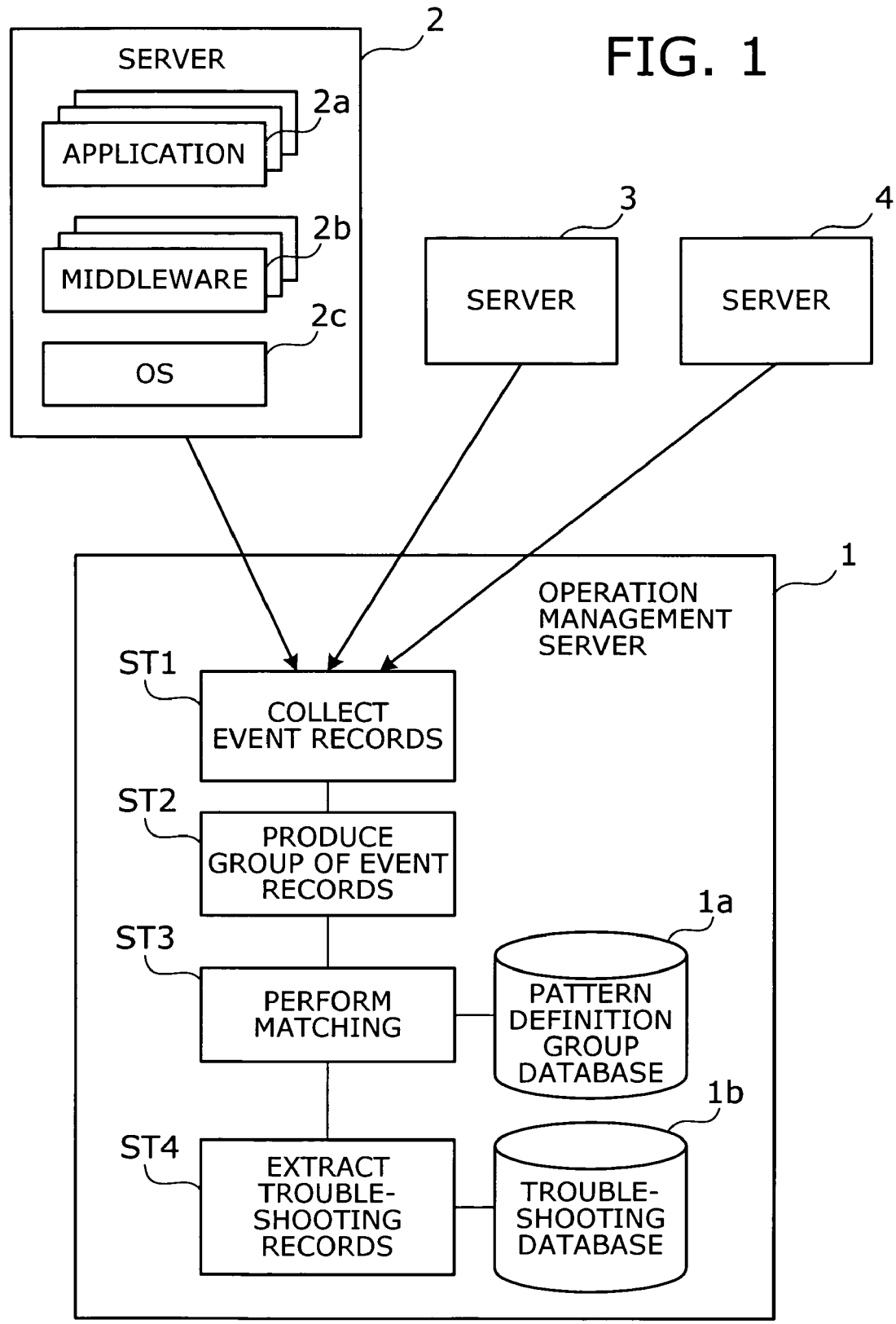
FIG. 1 is a conceptual view of the present invention.

Preferred embodiments of the present invention will be described below with reference to the accompanying drawings, wherein like reference numerals refer to like elements throughout. The following description begins with an overview of the present invention and then proceeds to more specific embodiments of the invention.

FIG. 1 is a conceptual view of the present invention. In the system of FIG. 1, an operation management server 1 executes an operation management method according to the present invention. This operation management server 1 is connected to a plurality of servers 2 to 4. Software programs running on the server 2 include application programs 2a, middleware programs 2b, and operating system (OS) programs 2c, which are among the target objects that the operation management server 1 are monitoring. Similar software programs are running on other servers 3 and 4.

The operation management server 1 has a pattern definition group database 1a and a troubleshooting database 1b, which have been prepared beforehand. The pattern definition group database 1a stores a plurality of pattern definition groups each defining a pattern of event records that could be produced from a plurality of target objects when a particular problem occurs. The troubleshooting database 1b stores troubleshooting records containing information about target objects that could be a source of a problem. Those troubleshooting records are associated beforehand with corresponding pattern definition groups in the pattern definition group database 1a. Specifically, a troubleshooting record contains the following data items: problem location, problem cause, and countermeasure to a problem.

In operation, the operation management server 1 performs the following tasks. First, the operation management server 1 collects event records from a plurality of target objects being monitored (step ST1). Here the term "target objects" refers to various functions executed on servers. The operation management server 1 then produce an event group by grouping the collected event records (step ST2). After that, the operation management server 1 compares the produced event group with each pattern definition group in the pattern definition group database 1a, in terms of occurrence patterns of event records (step ST3). As a result of this matching process, the operation management server 1 finds a particular pattern definition group resembles the given event group in terms of occurrence patterns of event records. The operation management server 1 then consults the troubleshooting database 1b to extract a relevant troubleshooting record associated with the matching pattern definition group that is found (step ST4).

Here, the resemblance between two groups in occurrence patterns of event records refers to the fact that they share at least one common event record.

With the above-described operation management method, event records collected from target objects are sorted into groups. One resulting event group is compared with a plurality of pattern definition groups in terms of occurrence patterns of event records. A pattern definition group with a similar occurrence pattern is then found, and its associated troubleshooting record is extracted.

The proposed method permits an administrator taking care of the operation management server to identify the location and cause of a problem, as well as receiving a suggestion of possible countermeasures to that problem, based on the retrieved troubleshooting record. For an event group that has no relevant pattern definition group, a new pattern definition group for that event group is created and stored in the pattern definition group database 1a when the problem is solved. In addition, a new troubleshooting record is entered to the troubleshooting database 1b. Countermeasures and other actions that some service engineers took against problems in the past can thus be reused by other service engineers as necessary.

The operation management method described above reduces the time required for troubleshooting regardless of the ability of an individual operator. It uses accumulated knowledge about past problems and countermeasures in the pattern definition groups and troubleshooting records, thus making it possible to cope with a similar problem quickly and adequately. When one has solved a newly discovered problem, the record of that trouble will be registered as a pattern definition group and a troubleshooting record, which eliminates the need for him/her to let others know it in person. This feature prevents a problem from being unsolved for a long time due to irrelevant measures taken.

Problem Detection Function

Figure 2:
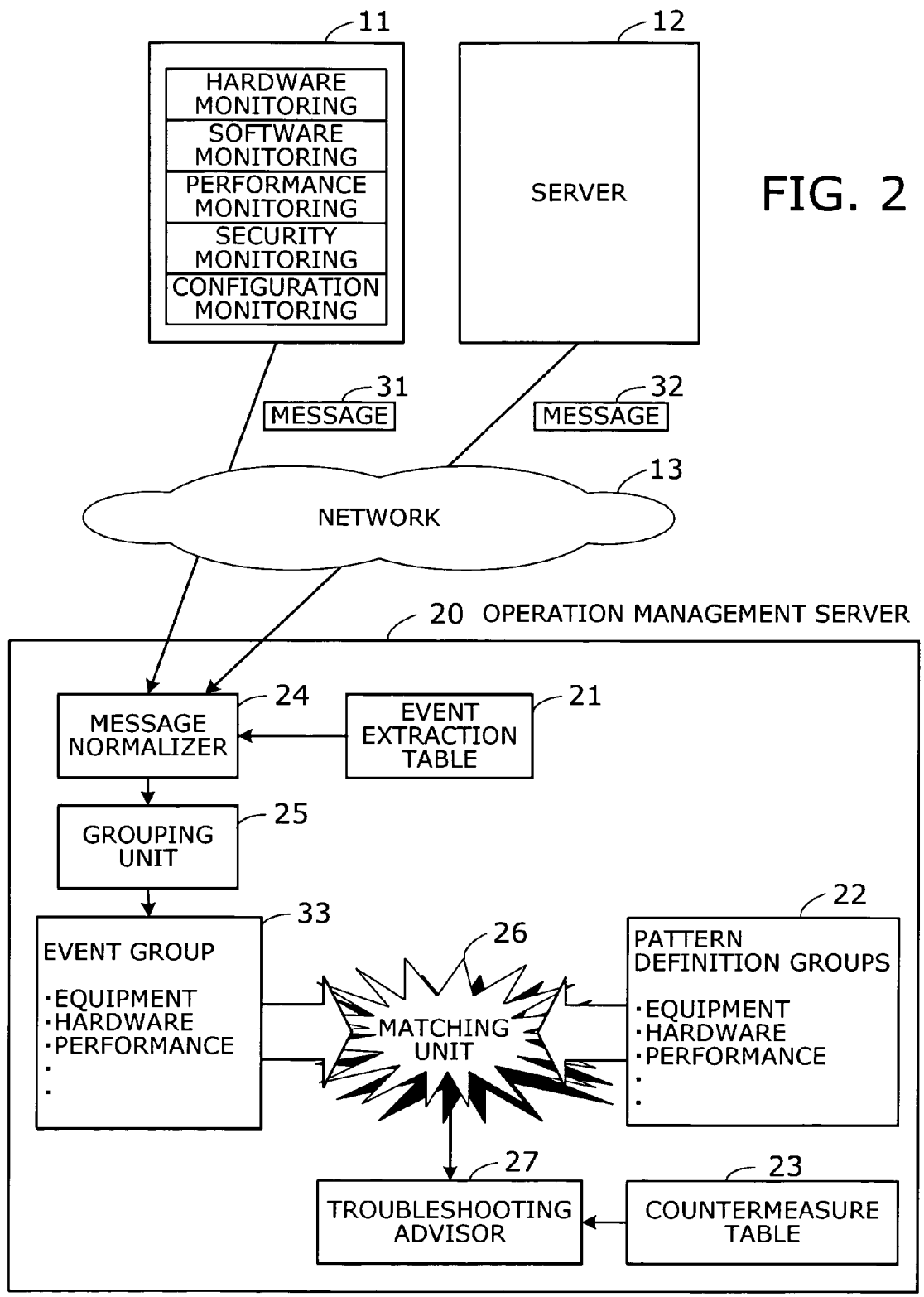
FIG. 2 shows an example of how a problem is solved with a regression-based troubleshooting method using problem records.

The concept of the proposed problem detection function (or regression-based troubleshooting method using problem records) in the present embodiment will now be described below. FIG. 2 shows an example of how a trouble is solved with a regression-based troubleshooting method using problem records. As can be seen, a plurality of servers 11 and 12 are connected to an operation management server 20 via a network 13. One server 11 has built-in supervisory functions including: hardware monitoring, software monitoring, performance monitoring, security monitoring, and configuration monitoring. Another server 12 also has such supervisory functions.

The hardware monitoring function tracks the behavior of hardware modules (e.g., watching the write error rate of a hard disk drive) used in the server 11. The software monitoring function is a collection of modules each monitoring a particular piece of software, such as an OS program, middleware program, or application program. The performance monitoring function supervises the operation condition (e.g., free memory space) of the server 11. The security monitoring function watches illegal access attempts to the server 11. The configuration monitoring function finds a change in the configuration of the server 11.

Upon occurrence of a particular event such as an error, each supervisory function generates an error event. An event record describing details of this error event is produced and delivered to the operation management server 20 via the network 13 in the form of a message. Such messages 31 and 32 carry, for example, log records and configuration change notice that the servers 11 and 12 produce.

The operation management server 20 comprises an event extraction table 21, pattern definition groups 22, a countermeasure table 23, a message normalizer 24, a grouping unit 25, a matching unit 26, and a troubleshooting advisor 27. The event extraction table 21 is a data table containing the definition of rules for extracting necessary event records from received messages. The pattern definition groups 22 are a collection of datasets each defining a combination of events which are expected to be generated when a particular problem occurs.

The countermeasure table 23 is a data table containing information about countermeasures corresponding to various event patterns that would be encountered when a failure occurs. The message normalizer 24 normalizes messages received from the servers 11 and 12 to make them comply with a predetermined data structure. More specifically, when messages are received, the message normalizer 24 consults the event extraction table 21 to obtain an event record extracting rule that is relevant to each received message. The message normalizer 24 then scans each message according to the obtained rule to extract information as an event record.

The grouping unit 25 then sorts the extracted event records into groups, each consisting of interrelated event records. Association between particular target objects (e.g., device, OS, middleware, application) is previously defined. Event records that those associated target objects have produced in a predetermined short period are regarded as being interrelated. The grouping unit 25 performs such a grouping task with given event records, thus producing an event group 33 consisting of interrelated event records.

The matching unit 26 compares the produced event group 33 with the pattern definition groups 22 so as to find an exact match or a best match in the pattern definition groups 22. When a similar pattern definition group is found, the troubleshooting advisor 27 obtains a countermeasure record relevant to that pattern definition group, with reference to the countermeasure table 23. The troubleshooting advisor 27 outputs the obtained countermeasure record for display on a terminal console or a similar device (not shown) linked to the operation management server 20.

Message Normalizing

Figure 3:
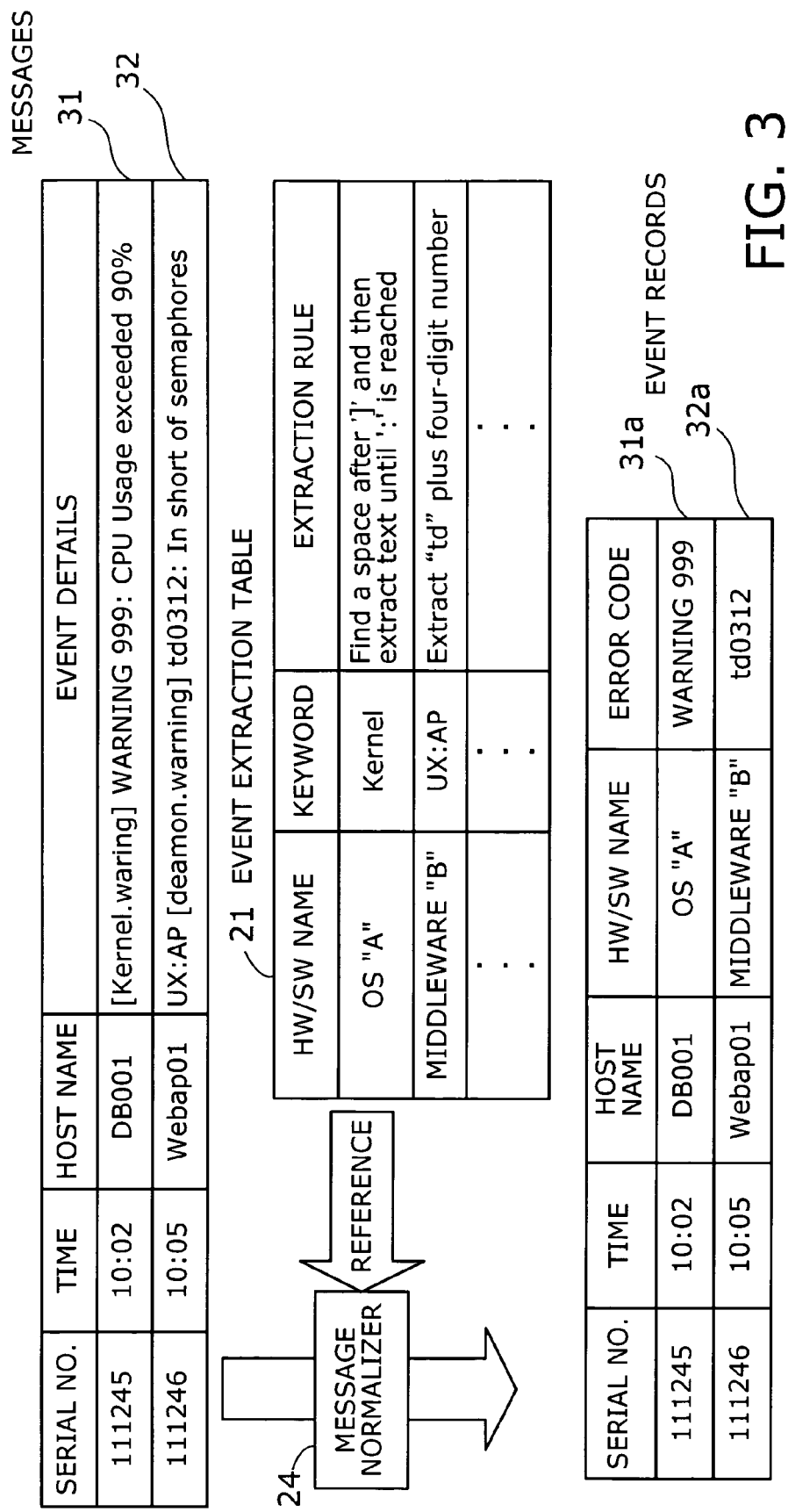
FIG. 3 shows a message normalization process.

In the above system, messages 31 and 32 sent from the servers 11 and 12 to the operation management server 20 are processed in the following way. First, the message normalizer 24 turns those messages 31 and 32 into event records with a unified format. FIG. 3 shows this message normalization process. In the example of FIG. 3, the messages 31 and 32 carry the following data items: "Serial No.," "Time," "Host Name," and "Event Details." The serial No. field of a message contains an identification code that permits the message to be uniquely distinguished from others. The time field indicates when the event occurred. The host name field contains the host name of a server that produced the message. Host names are used to designate each particular device on the network 13. The event details field shows what the originating supervisory function in that server produced as an event.

Upon reception of those messages 31 and 32, the message normalizer 24 consults the event extraction table 21. The event extraction table 21 has the following data fields: "Hardware/Software (HW/SW) Name," "Keyword," and "Extraction Rule." An extraction rule of message information is formed from a plurality of data items associated in the same row. The HW/SW name field gives the name of an element that causes an event. The keyword field contains a string that is used to determine which object caused the event in question. The extraction rule field describes how to extract a necessary error code from a given message.

The message normalizer 24 can produce event records 31a and 32a from given messages 31 and 32 by consulting the event extraction table 21 described above. More specifically, the reception of messages 31 and 32 causes the message normalizer 24 to look into the keyword field of the event extraction table 21. It then scans the body of each message to find a keyword. When a keyword is found, the message normalizer 24 refers to the extraction rule field corresponding to that keyword. According to this extraction rule, the message normalizer 24 extracts an error code out of the event details field of the message.

Take the message 31, for example. Upon receipt of this message 31, the message normalizer 24 first fetches a keyword "Kernel" from the event extraction table 21. Since this keyword exists in the message 31, the message normalizer 24 then refers to the corresponding extraction rule field, which reads as follows: "Find a space after ']' and then extract text until ':' is reached." According to this instruction, the message normalizer 24 extracts a text string "WARNING 999."

The message normalizer 24 now produces event records 31a and 32a containing an error code. Each event record 31a and 32a has the following data fields: "Serial No.," "Time," "Host Name," "HW/SW Name," and "Error Code." The serial No. field, time field, and host name field contain what are found in the corresponding fields of the messages 31 and 32. The HW/SW name field and error code field, on the other hand, are fetched from corresponding fields of the event extraction table 21 that are associated with a keyword that is found. In this way, normalized event records 31a and 32a are extracted from the given messages 31 and 32.

Event Grouping

Figure 4:
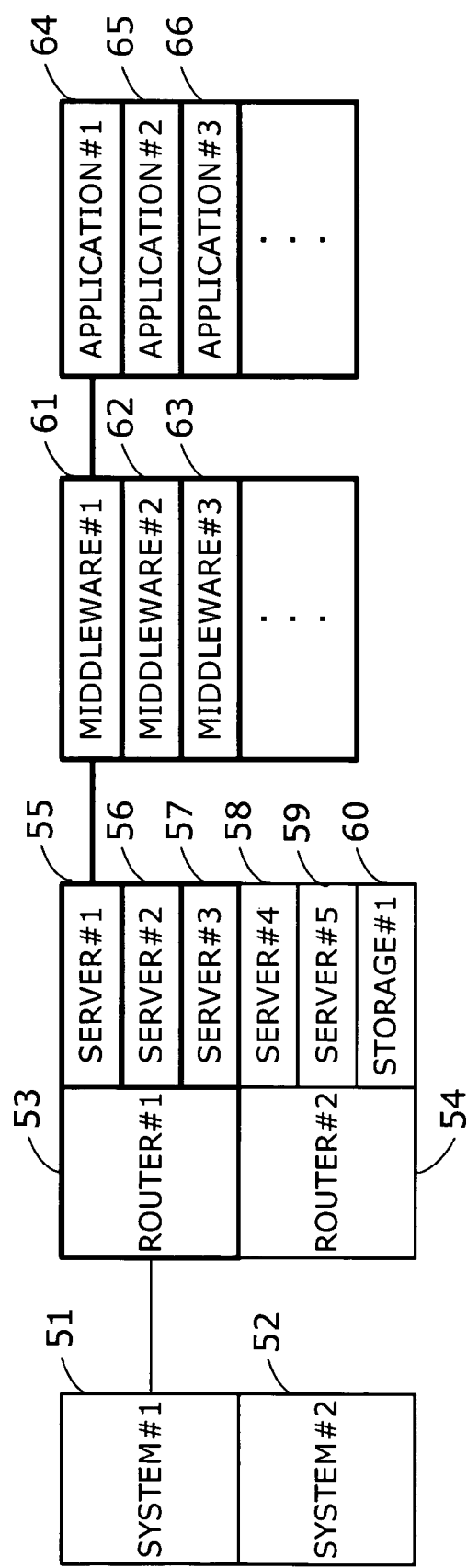
FIG. 4 shows an example structure of configuration management data.

After normalization, the grouping unit 25 combines interrelated event records into a group. Specifically, the grouping unit 25 has configuration management data, a collection of predetermined definitions of relationships between target objects being monitored. FIG. 4 shows an example structure of this configuration management data, which represents target objects in a hierarchical fashion. Placed in the topmost layer (shown at the leftmost end in FIG. 4) are systems 51 and 52, which are followed by routers 53 and 54, servers 55 to 59 and a storage device 60, middleware programs 61 to 63, and application programs 64 to 66 in that order.

All those target objects are represented by their identifiers, whose relationships are as follows: The systems 51 and 52 are, for example, network systems of different customers. Associated with those systems 51 and 52 are routers 53 and 54, which receive and forward packets to enable access to the systems 51 and 52. Servers 55 to 59 deployed in the systems 51 and 52 are associated with the routers 53 and 54. Also associated with the router 54 is a storage device 60 in the system 52. Middleware programs 61 to 63 installed in the server 55 is associated with that server 55. Application programs 64 to 66, associated with the middleware program 61, are software applications managed by that program 61.

As seen from this example, the grouping unit 25 is given a dataset that defines associations between different target objects being monitored. This dataset permits the grouping unit 25 to identify interrelated event records. More specifically, the target objects are organized with their parent-child relationships defined in a tree structure. Based on this tree structure, the grouping unit 25 recognizes a particular set of produced event records as being interrelated.

The configuration management data shown in FIG. 4 can also be used for suppressing events during a maintenance task. That is, when a target object is subjected to a maintenance task, it is necessary to control the occurrence of events related to that object under maintenance. It is further desirable that objects located below the target object of interest in the hierarchy should be controlled to prevent new events from being generated during that time. Specifically, when an upper-layer target object (e.g., middleware) is in maintenance mode, its subordinate lower-layer object (e.g., application) may produce an error event even though that lower-layer object has nothing wrong with it. Since such events are simply unnecessary in maintenance activities, the lower-layer objects have to be requested not to produce events during a maintenance period.

Suppose, for example, that the router 53 shown in FIG. 4 is under maintenance. Objects located below the router 53 include servers 55 to 57, middleware programs 61 to 63, and application programs 64 to 66, which may generate events during maintenance of the router 53. Event suppression thus takes place on those lower-layer structural components. To this end, the grouping unit 25 is designed to specify such components by consulting its local configuration management data, when a particular target object is subjected to maintenance actions. The grouping unit 25 also determines a suppression period and sends an event suppression request to the relevant target objects.

It can also happen that the target object under maintenance produces some events in the middle of the maintenance task. Those events are subjected to the grouping process and stored as a pattern definition group that describes a problem with the object under maintenance.

Figure 5:
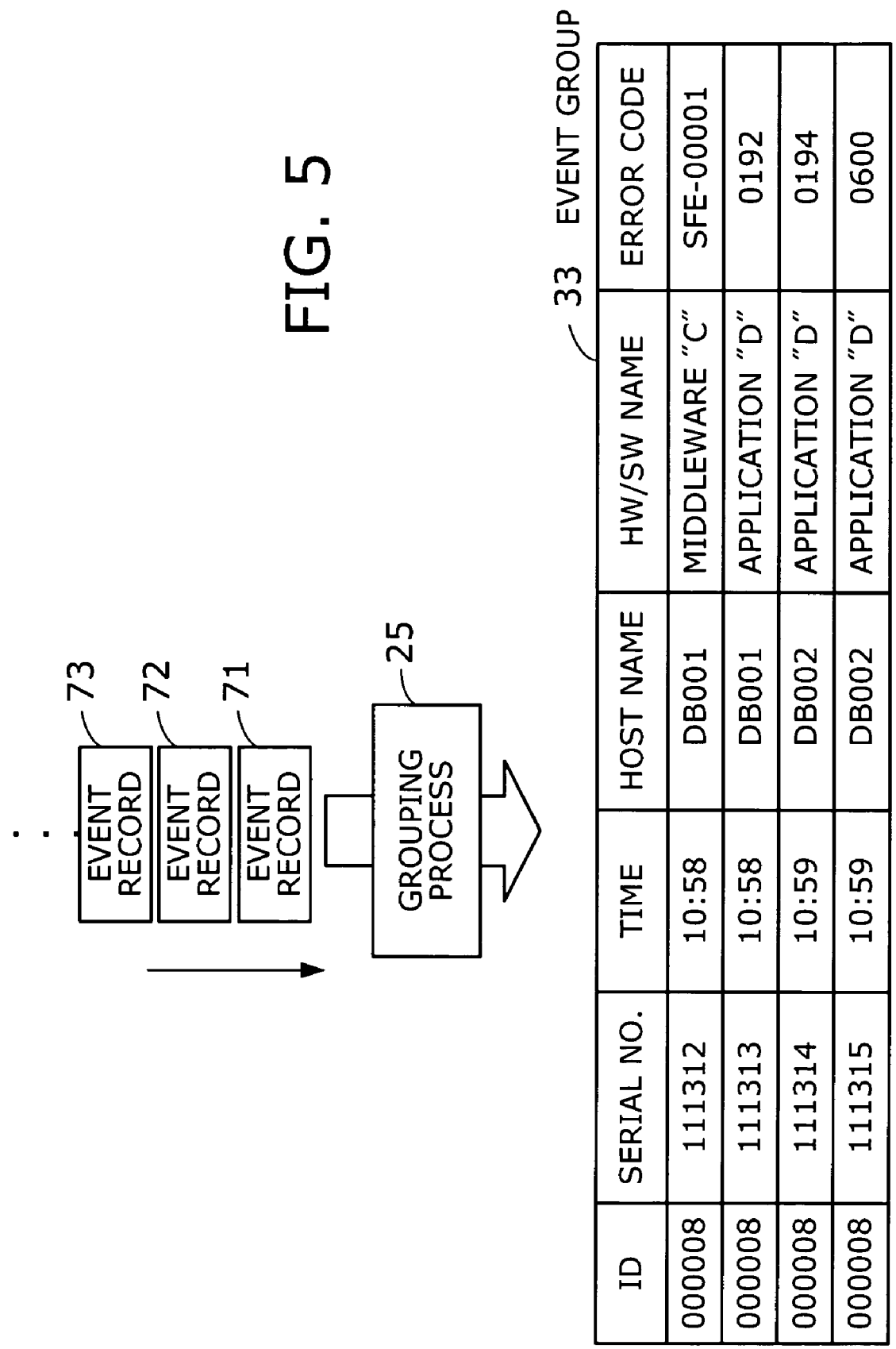
FIG. 5 shows the concept of a process of grouping event records.

As can be seen from the above, the grouping unit 25 sorts event records into groups by using configuration management data to identify their relationships. FIG. 5 shows the concept of a process of grouping event records. The message normalizer 24 supplies the grouping unit 25 with a series of normalized event records 71 to 73 as FIG. 5 shows. The grouping unit 25 finds interrelated ones among the received event records, and then forms them into an event group 33. The event group 33 is assigned an identifier (ID) to uniquely identify each event group. The event group 33 contains detailed data items other than this ID, which are the same as its original event records.

Event Pattern Matching

The produced event group 33 is passed to the matching unit 26. The matching unit 26 compares this event group 33 with pattern definition groups 22. FIG. 6 schematically shows a matching process. The pattern definition groups 22 include various combinations of hardware events, software events, and other events that would be produced by middleware programs and application programs. By comparing a given event group 33 with those pattern definition groups 22, the matching unit 26 identifies what problem has caused the event group 33. When a pattern definition group corresponding to the given event group 33 is found, a countermeasure record corresponding to that pattern definition group should then be extracted.

FIG. 7 shows an example of event group matching and countermeasure record retrieval. As can be seen from FIG. 7, the HW/SW name field and error code field of the event group 33a coincide with the counterparts of one pattern definition group 22a. This pattern definition group 22a has an ID of "PT0008." The troubleshooting advisor 27 then searches the countermeasure table 23 for a countermeasure record corresponding to this ID "P0008."

The countermeasure table 23 has the following data fields: "ID," "Cause," "Countermeasure," and "Urgency Level." A plurality of data fields associated in the same row, forming a single data record. The ID field of this countermeasure record stores a unique identifier assigned to the record for identification purposes. The countermeasure record IDs and their corresponding pattern definition group IDs share the same value at their lower four digits. For example, pattern definition group "PT0008" is associated with countermeasure record. "000008." The cause field indicates the cause of a problem, which includes information about some target objects that could be involved in the problem (e.g., disks in this example). The countermeasure field suggests what to do to solve the problem. The urgency level field indicates the importance of the problem. A problem having a larger value in this field requires more immediate action.

In the example of FIG. 7, the troubleshooting advisor 27 extracts a countermeasure record corresponding to the pattern definition group 22a. According to the extracted countermeasure record 23a, the current problem is caused by "Performance degradation due to aging of disk drives." The suggested countermeasure is: "Replace RAID disks." Also indicated is an urgency level of "2."

The matching unit 26 not only finds a pattern definition group that exactly coincides with a given event group, but may also extract similar pattern definition groups. If this is the case, the matching unit 26 puts some additional information to the extracted pattern definition group to record how many matches and mismatches are found. Specifically, the additional information includes a match count and a mismatch count. The term "match count" refers to the number of matching event records found in a pattern definition group that is extracted. The terms "mismatch count" refers to the number of mismatched event records in that pattern definition group. The mismatch count will have a negative value in the case that some event records are missing in the pattern definition group being compared. The mismatch count will have a positive value in the case that there are some excessive event records in the pattern definition group.

Figure 8:
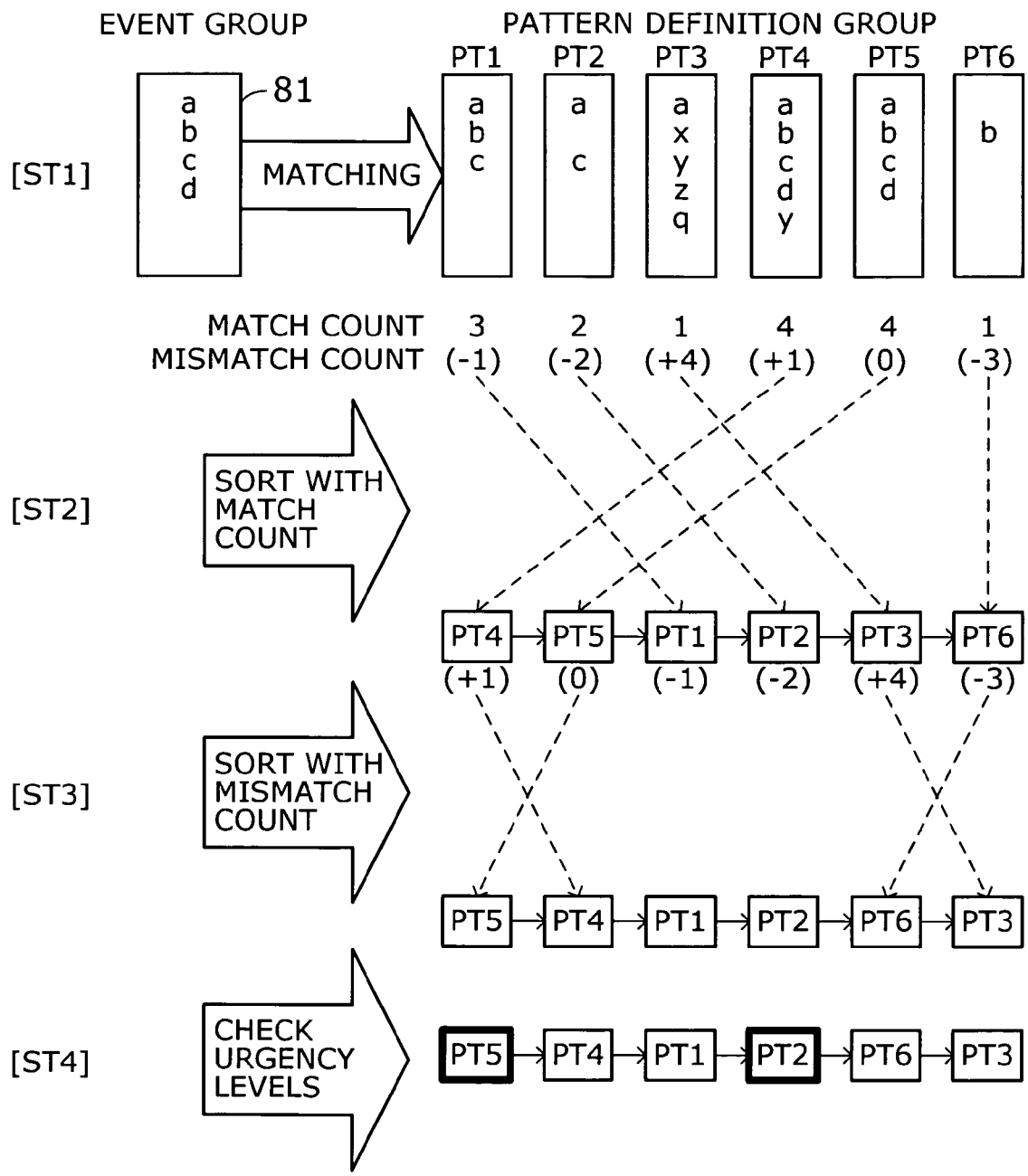
FIG. 8 shows a procedure of sorting matching results.

Before displaying countermeasure records corresponding to the extracted pattern definition groups, the troubleshooting advisor 27 sorts those records in an appropriate order according to their match count and mismatch count. FIG. 8 shows a procedure of sorting matching results, in which one event group 81 is compared with six different pattern definition groups. Their IDs are: PT1, PT2, PT3, PT4, PT5, and PT6.

[ST1] The matching unit 26 first compares the given event group 81 with each pattern definition group. In the example of FIG. 8, the event group 81 includes four event records "a," "b," "c," and "d." Pattern definition group "PT1" includes three event records "a," "b," and "c." Pattern definition group "PT2" includes two event records "a" and "c." Pattern definition group "PT3" includes five event record "a," "x," "y," "z," and "q." Pattern definition group "PT4" includes five event records "a," "b," "c," "d," and "y." Pattern definition group "PT5" includes four event records "a," "b," "c," and "d." Pattern definition group "PT6" includes one event record "b."

The comparison with each individual pattern definition group results in a pair of match count and mismatch count. Specifically, for the pattern definition group with ID="PT1," the comparison yields a match count of 3 and a mismatch count of −1. For the pattern definition group with ID="PT2," the comparison yields a match count of 2 and a mismatch count of −2. For the pattern definition group with ID="PT3," the comparison yields a match count of 1 and a mismatch count of +4. For the pattern definition group with ID="PT4," the comparison yields a match count of 4 and a mismatch count of +1. For the pattern definition group with ID="PT5," the comparison yields a match count of 4 and a mismatch count of 0. For the pattern definition group with ID="PT6," the comparison yields a match count of 1 and a mismatch count of −3.

[ST2] With the matching results, the troubleshooting advisor 27 first sorts the pattern definition groups in the descending order of match count. In the present example, the sorted groups are in the following order: "PT4," "PT5," "PT1," "PT2," "PT3," "PT6."

[ST3] Then the troubleshooting advisor 27 applies a local sorting to the pattern definition groups according to their mismatch counts. This time, a group with a smaller absolute value of mismatch count gains a higher position. The result is as follows: "PT5," "PT4," "PT1," "PT2," "PT6," "PT3".

[ST4] Lastly, the troubleshooting advisor 27 retrieves a countermeasure record corresponding to each pattern definition group. It then looks into the urgency level field of the retrieved countermeasure records and marks those records having high urgency levels that exceed a predetermined threshold. The troubleshooting advisor 27 gives an emphasis to those marked countermeasure records when outputting them on a monitor screen. Suppose, for example, that pattern definition groups "PT2" and "PT5" are associated with countermeasures with high urgency levels. Then their corresponding countermeasure records will be highlighted.

Now that a set of countermeasure records have been obtained on the basis of events occurred at target objects, the troubleshooting advisor 27 displays the sorted countermeasure records, emphasizing some specified records. Emphasis can be achieved by using a special color that is distinguishable from others.

Figure 9:
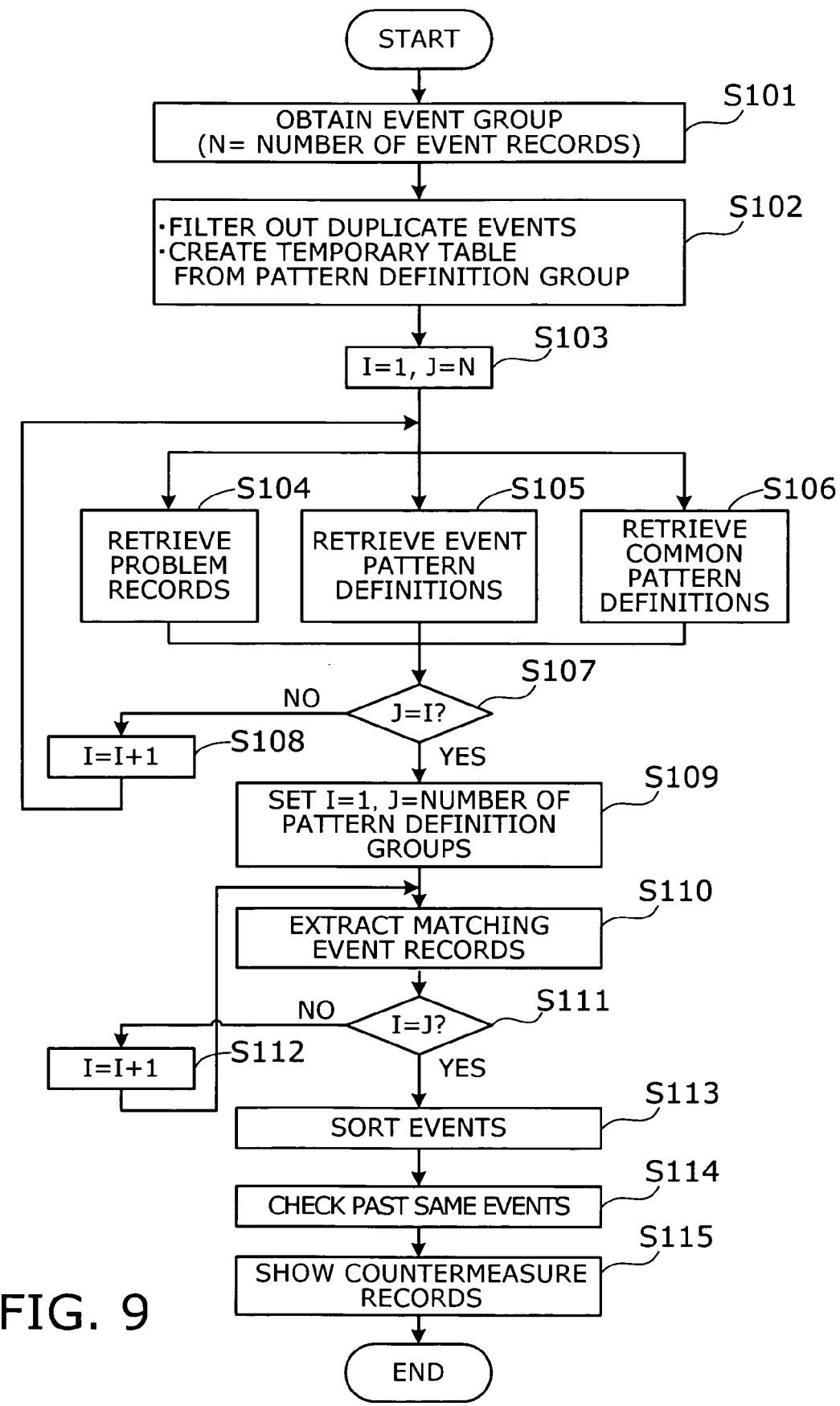
FIG. 9 is a flowchart showing a process executed by a matching unit.

FIG. 9 is a flowchart showing a process executed by a matching unit. This process includes the following steps:

(Step S101) The matching unit 26 obtains an event group 33. Let a natural number N represent the number of event records included in this event group 33.

(Step S102) The matching unit 26 performs duplicate event filtering and then creates temporary tables from a database containing a plurality of pattern definition groups 22. Temporary tables serve as databases formed only of pattern definition groups 22 that can be applied to the system of interest. More specifically, temporary tables accommodate several different databases. One database stores common pattern definition groups that are applicable to every system. Another database contains customer-specific pattern definition groups that can be produced in relation to each customer's specific system configuration. Yet another database stores problem records corresponding to those pattern definition groups. These databases (temporary tables) will be used at later steps S104 to S106.

(Step S103) The matching unit 26 assigns 1 to variable I, as well as N to variable J (i.e., I=1, J=N). The following steps S104 to S106 are then executed in parallel.

(Step S104) The matching unit 26 searches the problem record database to find problem records associated with the Ith event record.

(Step S105) The matching unit 26 searches the customer-specific pattern definition group database to find pattern definition groups associated with the Ith event record.

(Step S106) The matching unit 26 searches the common pattern definition group database to find pattern definition groups associated with the Ith event record.

(Step S107) The matching unit 26 determines whether J=I holds. If J=I, then the process advances to step S109. Otherwise, the process proceeds to step S108.

(Step S108) The matching unit 26 increments I by one (i.e., I=I+1). The process then goes back to steps S104 to S106.

(Step S109) The matching unit 26 assigns 1 to variable I (I=1), as well as the number of found pattern definition groups to variable J.

(Step S110) The matching unit 26 selects the Ith pattern definition group that has been found at steps S105 and S106. Out of this pattern definition group, the matching unit 26 extracts and counts such event records that have common items with the given event group.

(Step S111) The matching unit 26 determines whether I=J holds. If I=J, then the process advances to step S113. Otherwise, the process proceeds to step S112.

(Step S112) The matching unit 26 increments I by one (I=I+1). The process then goes back to step S110.

(Step S113) The matching unit 26 sorts the events.

(Step S114) The matching unit 26 checks whether there is a record of the same event in the past.

(Step S115) The troubleshooting advisor 27 extracts pattern definition groups whose event records at least partly agree with those in the event group. It then displays countermeasure records of the pattern definition groups that are extracted. This includes the information about possible causes of the present problem and appropriate countermeasures to them.

Through the above processing steps, the operation management server 100 collects information about the events occurred in the system and uses them as event groups to identify the cause of a problem and provide countermeasures in an automated way. The accumulated pattern definition groups enable the operation management server to quickly discover a problem that is similar to what occurred in the past. The pattern database also provides the information about cause and countermeasure in association with each particular event pattern. This feature reduces the time required for troubleshooting.

The operation management server centrally manages pattern definition groups and other data of many customers, thus helping the administrator to update them as necessary. With the pattern definition groups, a customer can locate their own problem by using other customers' similar experiences. The pattern definition groups may reflect policies of the operating organization, or include product support information supplied from software developers. The administrator registers those pattern definition groups with the operation management server to provide better server supervisory services.

Operation Management Server

The following section will now describe a specific example of remote maintenance service for customer systems using an operation management server with the problem detection functions described above.

Figure 10:
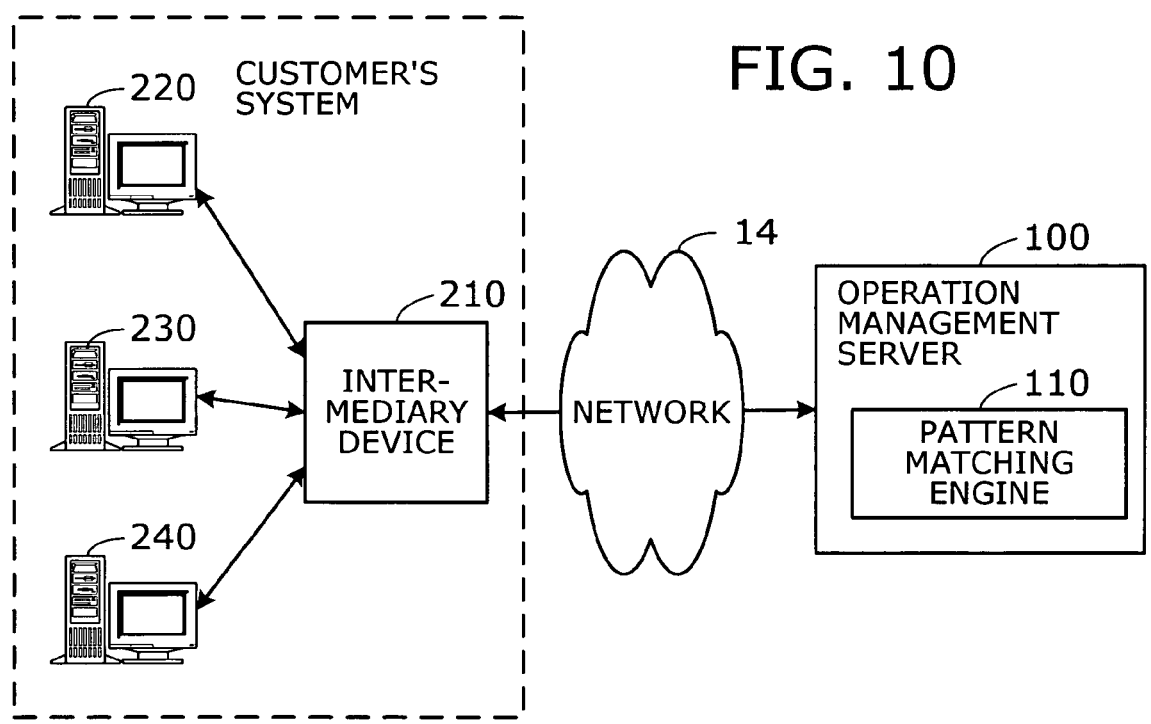
FIG. 10 shows an example system configuration where problem detecting functions are provided.

FIG. 10 shows an example system configuration where problem detecting functions are provided. In the example of FIG. 10, an operation management server 100 is linked to an intermediary device 210 via a network 14. Other devices linked to the intermediary device 210 are a plurality of servers 220, 230, and 240. Those servers 220, 230, and 240 and the intermediary device 210 belong to a customer's system. The operation management server 100 has a pattern matching engine 110. It is this pattern matching engine 110 that actually undertakes the tasks of collecting messages from the servers 220, 230, and 240, comparing them with pattern definition groups, and offering relevant countermeasure records.

Figure 11:
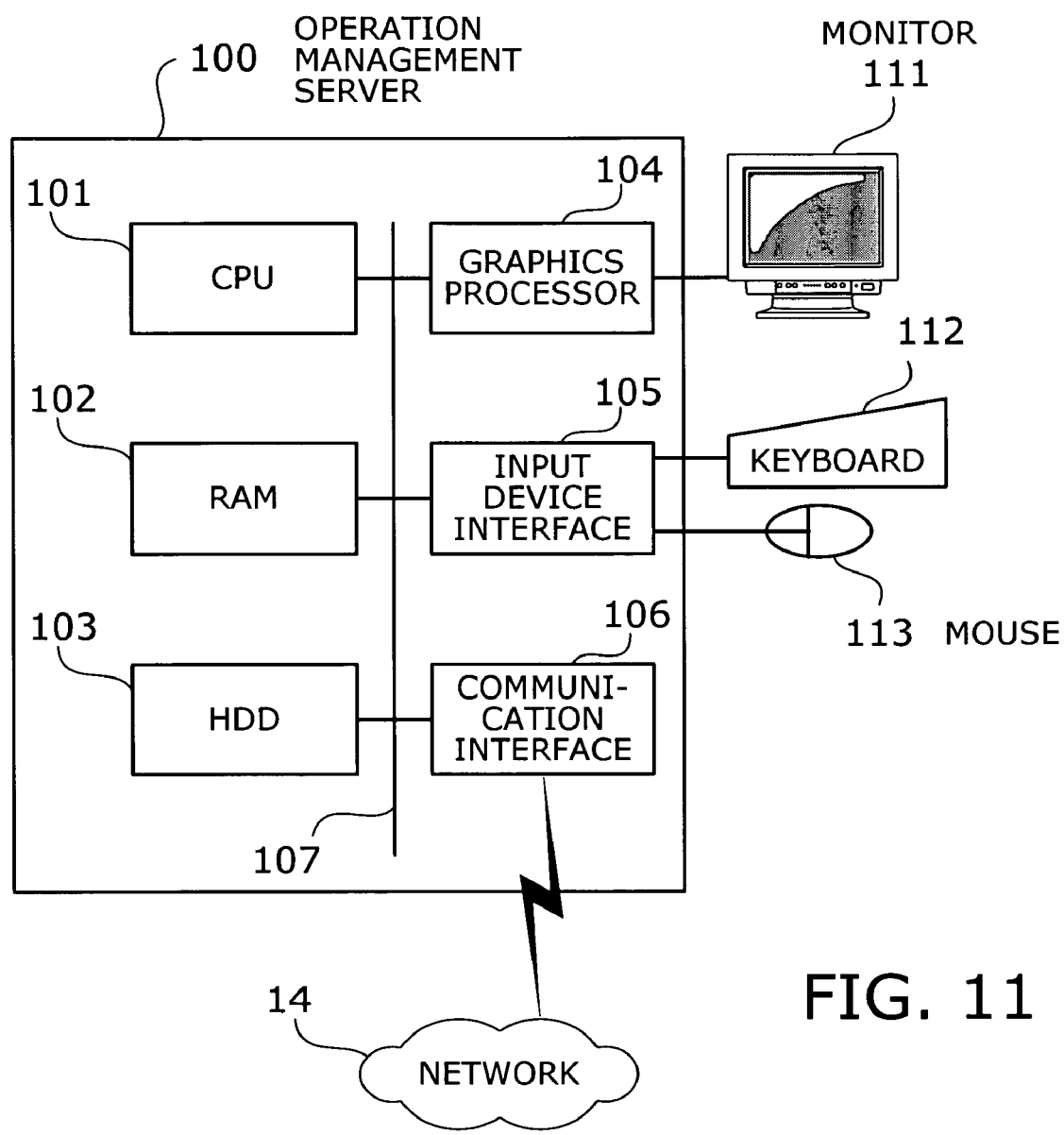
FIG. 11 shows an example hardware configuration of an operation management server used in an embodiment of the present invention.

FIG. 11 shows an example hardware configuration of an operation management server used in an embodiment of the present invention. The illustrated operation management server 100 has a central processing unit (CPU) 101, which controls the entire server system, interacting with other elements via a common bus. Connected to this CPU 101 are: a random access memory (RAM) 102, a hard disk drive (HDD) 103, a graphics processor 104, an input device interface 105, and a communication interface 106.

The RAM 102 serves as temporary storage for the whole or part of operating system (OS) programs and application programs that the CPU 101 executes, in addition to other various data objects manipulated at runtime. The HDD 103 stores program and data files of the operating system and various applications. The graphics processor 104 is coupled to a monitor 111. The graphics processor 104 produces video images in accordance with drawing commands from the CPU 101 and displays them on the screen of the monitor 111. The input device interface 105 is used to receive signals from external input devices, such as a keyboard 112 and a mouse 113. The input signals are supplied to the CPU 101 via the bus 107. The communication interface 106 is connected to the network 14 so as to exchange data with other computers (not shown) on the network 14.

The above hardware system provides a platform for the proposed processing functions of the present embodiment. While FIG. 11 only shows an operation management server 100 for illustrative purposes, the same hardware configuration may also be applied to the intermediary device 210 and servers 220, 230, and 240.

Figure 12:
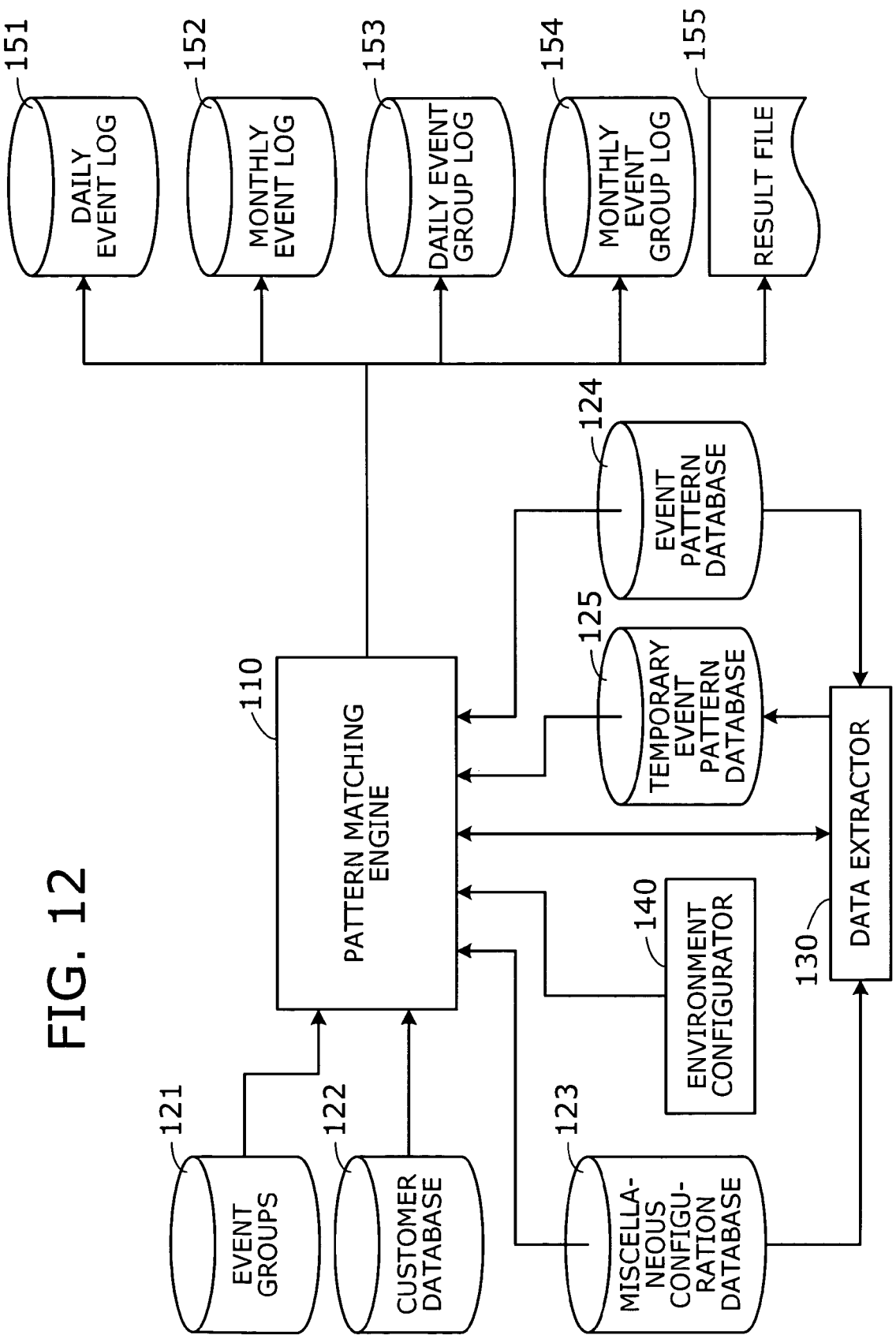
FIG. 12 is a block diagram showing an internal structure of an operation management server.

FIG. 12 is a block diagram showing an internal structure of the operation management server. As can be seen from this FIG. 12, the operation management server 100 has the following components: a pattern matching engine 110, event groups 121, a customer database 122, a miscellaneous configuration database 123, an event pattern database 124, a temporary event pattern database 125, a data extractor 130, an environment configurator 140, a daily event log 151, a monthly event log 152, a daily event group log 153, a monthly event group log 154, and a result file 155.

The pattern matching engine 110 controls the entire pattern matching process in cooperation with other functions. The event groups 121 are formed from messages sent from servers 220, 230, and 240. The customer database 122 stores information about customers. The miscellaneous configuration database 123 stores information about each customer's system configuration (in both hardware and software).

The event pattern database 124 is a database of event patterns concerning various problems that could happen in a supported system. Event patterns include pattern definition groups and countermeasure records. The temporary event pattern database 125 stores event patterns extracted from the event pattern database 124 according to each customer's system configuration. The data extractor 130 builds this temporary event pattern database 125 based on the event pattern database 124 by extracting event patterns relating to the system of a particular customer being served.

The daily event log 151 is a storage space used to keep a record of event pattern identifiers, matching results, and other data objects concerning problems that happened within a day. The monthly event log 152 is a storage space used to keep a record of event pattern identifiers, matching results, and other data objects concerning problems that happened within a month. The daily event group log 153 is storage space used to store event groups produced within a day. The monthly event group log 154 is storage space used to store event groups produced within a month. The result file 155 contains a list of countermeasure records retrieved with respect to a particular event group.

Configuration Database

The miscellaneous configuration database 123 contains hardware configuration data, software configuration data, network configuration data, and system configuration data. Each configuration data has a key data field that enables linking with other data.

FIG. 13 shows an example data structure of hardware configuration data. The hardware configuration data 123a has the following data fields: "Equipment ID," "System Name," "Host Name," "Product Name," "Number of CPUs," "Memory Capacity," "Disk Capacity," and "Number of LANs."

The equipment ID field shows the identifier of a computer operating as a server. This equipment ID is a code assigned in such a way that it will not be influenced by the length of the host name within the system. The system name field indicates the name of a system (or the type of a service) for which the server is working. The host name field shows a name assigned to the server for use in the network, or for management purposes. The product name field contains the product name of a computer platform of the server. The number-of-CPUs field indicates the number of CPUs mounted on the server. The memory capacity field shows the capacity of main memory on the server. The disk capacity field shows the storage capacity of hard disk units connected to the server. The number-of-LANs field indicates the number of network interface cards mounted on the server.

FIG. 14 shows an example data structure of software configuration data. This software configuration data 123b has the following data fields: "Equipment ID," "Software Class," "Software Name," "Version Number," and "Revision Number."

The equipment ID field exists also in the foregoing hardware configuration data 123a, which serves as a key field that establish associations between other data items in various configuration datasets. The software class field shows the category (e.g., OS, middleware, application, etc.) of a software program of interest. The software name field contains the name of that program. The version number field contains the version of the program. The revision number field shows the version of bug corrections (software patch) applied to the program.

FIG. 15 shows an example data structure of network configuration data. This network configuration data 123c has the following data fields: "Customer Code," "Equipment ID," "Host Name," "IP," "Interface Name," and "IP Address Type." The customer code field gives an identifier indicating which customer is operating the system. The equipment ID field exists also in the hardware configuration data 123a and software configuration data 123b, which serves as a key field that establishes associations between other data items in those datasets. The host name field contains the same item as that in the hardware configuration data 123a. The IP field shows the IP address assigned to the system. The interface name field shows an identification code that is assigned to each network interface card in a device. The IP address type field shows the type of IP address, which is either "V" or "R." Here, "V" is a short form of "virtual," standing for a virtual IP address. "R" is "Real," standing for a real IP address.

FIG. 16 shows an example data structure of system configuration data. This system configuration data 123d has the following data fields: "Customer Code," "Equipment ID," "Related Host Name," "Related Class," and "Related Software." The customer code field contains the same value as what the network configuration data 123c has in its customer code field. The equipment ID field contains the same value as what the hardware configuration data 123a, software configuration data 123b, and network configuration data 123c have in their respective equipment ID fields. The related host name field contains the equipment ID of a relating computer. When this field has a value of "PP9999," it means that that there is no relation to other equipment.

Message Grouping (Details)

Figure 17:
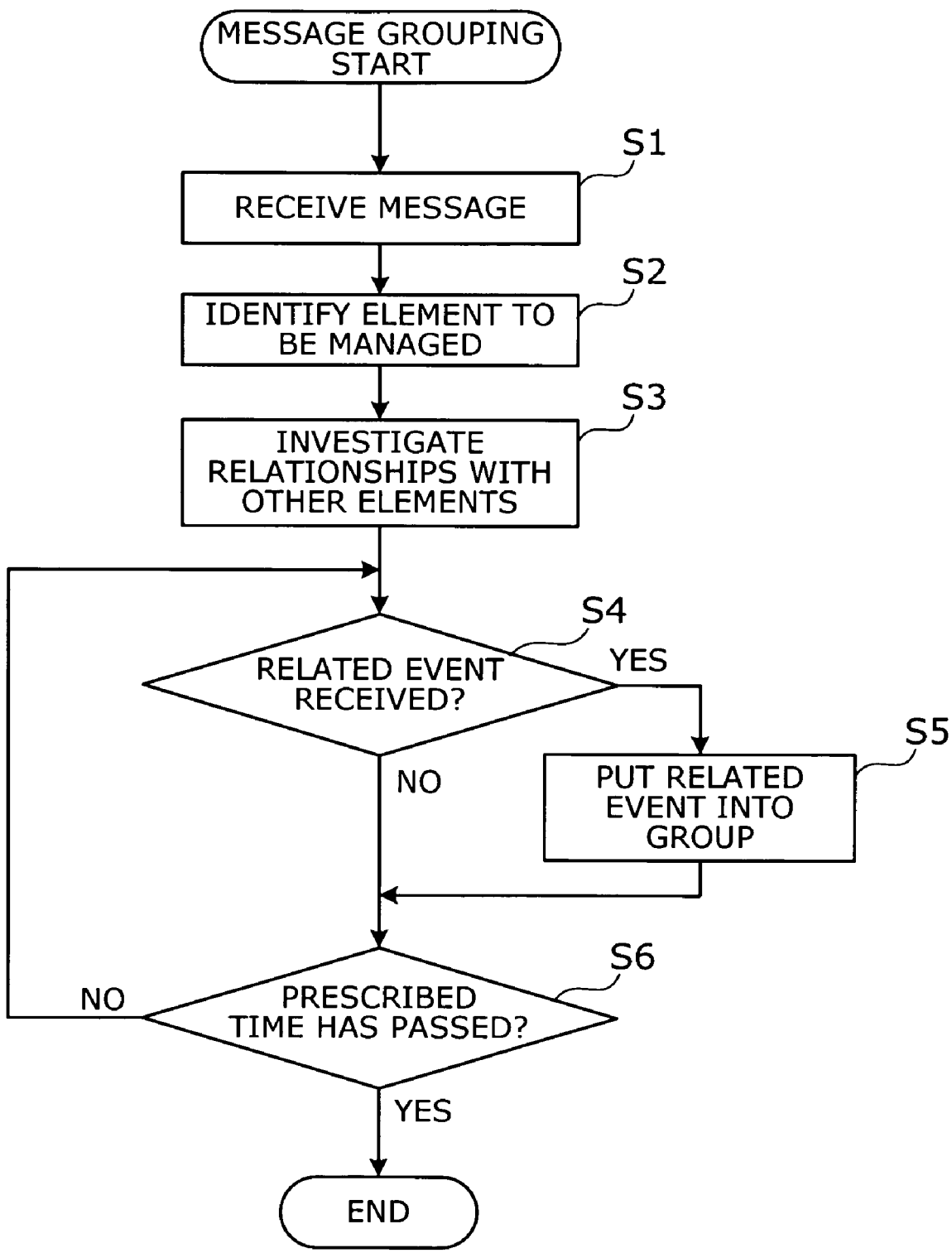
FIG. 17 is a flowchart of a process of grouping messages.

With the above-described configuration, the operation management server 100 performs various tasks described below. First, a process of grouping messages will be explained. FIG. 17 is a flowchart of a message grouping process. This process includes the following steps:

(Step S1) The data extractor 130 receives a message. Specifically, suppose that a server has encountered an error event. The server then transmits a message to inform the operation management server 100 of the error event details. In the operation management server 100, the received message is supplied to its pattern matching engine 110.

(Step S2) Besides reformatting (i.e., normalizing) the received message, the data extractor 130 identifies managed objects (hardware, software, etc.) by consulting the miscellaneous configuration database 123.

(Step S3) The data extractor 130 investigates association of one managed object with other managed objects, with reference to the miscellaneous configuration database 123.

(Step S4) The data extractor 130 tests whether any related event is received. If so, the process advances to step S5. If not, the process proceeds to step S6.

(Step S5) The data extractor 130 puts the related event into a relevant group.

(Step S6) The data extractor 130 determines whether a prescribed time has passed after the arrival of messages at step S1. If so, the data extractor 130 finalizes the event group and passes the control to the pattern matching engine 110. If not, the process proceeds to step S4.

Figure 18:
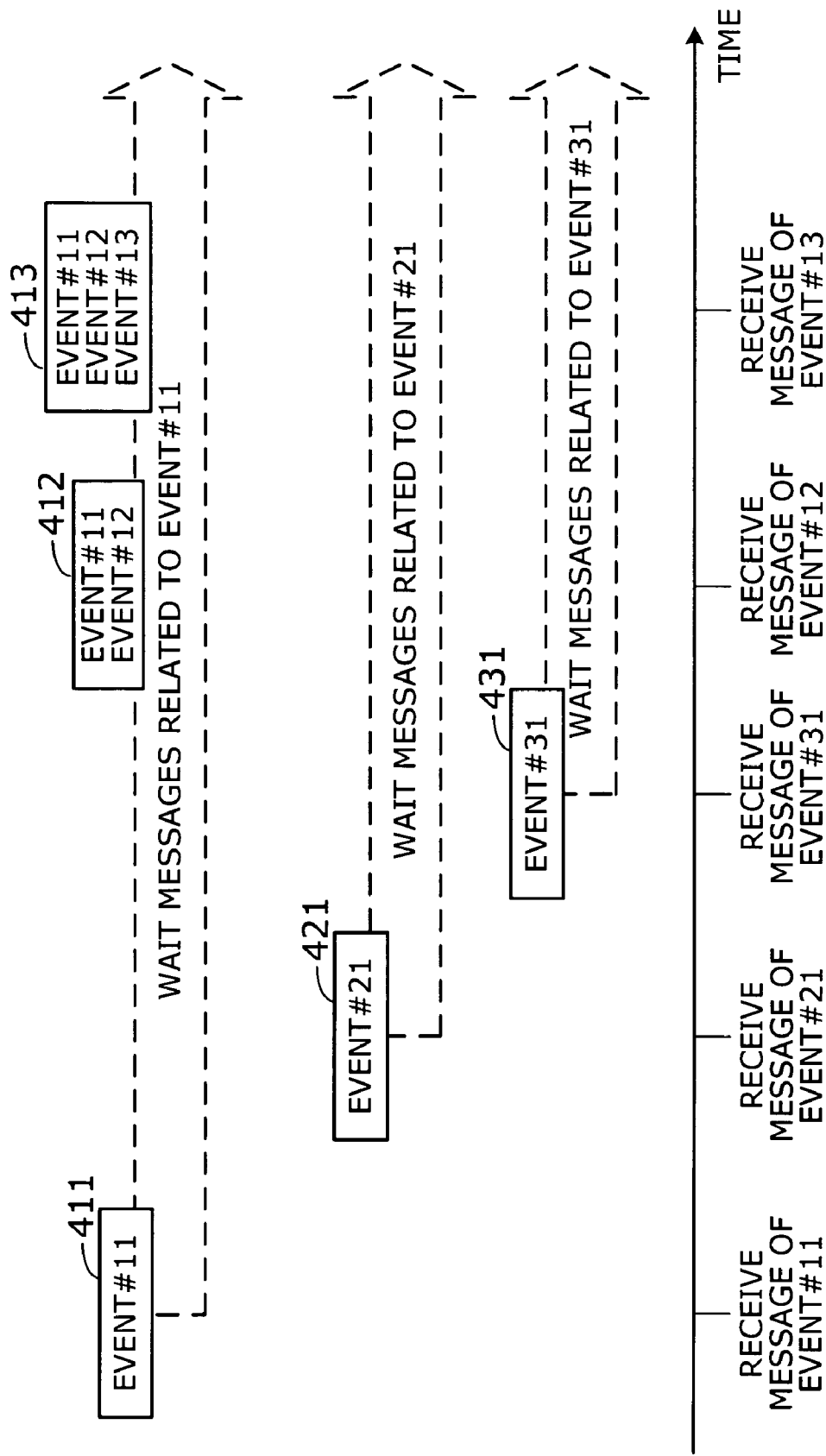
FIG. 18 shows an example process of grouping events.

FIG. 18 shows an example process of grouping events. Suppose, for example, that a message of "Event#11" is entered. This leads to the creation of a new event group 411 containing that event record. Afterwards, a message "Event#21" comes, and another event group 421 including that event record is produced accordingly. In a similar way, a subsequent message "Event#31" causes yet another event group 431 containing that event record to be produced.

Suppose now that still another message "Event#12" relating to "Event#11" is received. This new event record is added to the event group 411 created earlier, which makes it grow to an event group 412 consisting of two event records. A message "Event#13" then arrives. The event record of this "Event#13" is added to the event group 412, which makes it grow to an event group 413 consisting of three event records.

The operation management server 100 builds some other databases for internal use, based on the event records sorted into groups in the way described above. FIG. 19 shows an example data structure of event groups. The illustrated event groups 121 have the following data fields: "Event Group ID," "Group Member Serial Number," "Event ID," "Customer ID," "Equipment ID," "Interface Name," "Occurrence Time," "Source Class," "Source Short Name," "Filtering," and "Message."

The event group ID field contains an identifier that is assigned to each event group. The group member serial number field shows a serial number that is given to each member of the same event group. Note that one event record constitutes one entry of an event group. The event ID field shows an identifier that is assigned to each event. The customer ID field shows the identifier of a customer who operates the system that has generated the event. The equipment ID field shows the identifier of a server that has generated the event. The interface name field shows the identifier of a network interface that sent the message carrying the present event record. The occurrence time field shows when the message arrived at the operation management server 100. The source class field shows which target object produced the event. The source short name field shows an abbreviated name of the source target object. The filtering field indicates whether to apply filtering. The message field shows the content of the received event record message.

While FIG. 19 has illustrated a data structure of an event group 121, the same or similar data structure is also applied to the daily event group log 153 and monthly event group log 154 mentioned earlier.

Figure 20:
FIG. 20 shows an example data structure of a customer database.

FIG. 20 shows an example data structure of a customer database. The illustrated customer database 122 has the following data fields: "Customer ID," "Customer Name," "Contact Person," and "Contact Information." The customer ID field shows the identifier of a customer. The customer name field shows the name of that customer. The contact person field shows the name of a person through whom the customer can be reached. The contact information field shows the customer's contact information such as phone numbers.

FIG. 21 shows an example data structure of an event pattern database. The illustrated event pattern database 124 has the following data fields: "Event Pattern ID," "Event Serial Number," "Object Class," "Object Short Name," and "Error Message." The event pattern ID field contains a unique identification code managed by this event pattern database. The event serial number field shows a reference number that is assigned to each member event record belonging to the same event pattern. The object class field shows the category to which the target object belongs. The error message field provides the content of the produced event.

While FIG. 21 illustrates an example data structure of the event pattern database 124, the same or similar data structure is also applied to the temporary event pattern database 125 mentioned earlier.

FIG. 22 shows an example data structure of a daily event log. The illustrated daily event log 151 has the following data fields: "Event Group ID," "Matching Process Timestamp," "Event Pattern ID," "Number of Events," and "Hit Count." The event group ID field contains the identification code of an event group. The matching process timestamp field indicates when the pattern matching engine 110 executed a pattern matching process for that event group. The event pattern ID field shows the identifier of an event pattern extracted in the pattern matching process. The number-of-events field shows the number of event records in the event pattern specified by the event pattern ID field. The hit count field stores the number of event records, of all those records having the same event pattern ID, that can also be found in the event group compared.

The weight of an event pattern can be calculated from the number of events and hit count shown in this daily event log 151. For example, a greater weight (meaning a greater importance) is given to an event pattern with a larger hit count. Such weights may be calculated previously and registered with the daily event log 151.

Figure 23:
FIG. 23 shows an example data structure of a daily event group log.

FIG. 23 shows an example data structure of a daily event group log. The illustrated daily event group log 153 has the following data fields: "Event Group ID," "Event Serial Number," "Event ID," "Customer ID," "Equipment ID," "Occurrence Time," "Event Type," "Error Number/Message," "Event Pattern ID," "Number of Duplicate Event IDs", and "Matching Result."

The event group ID field contains the identifier of an event group. The event serial number field shows a serial number that is assigned to each event produced. The event ID field contains the identifier of each event record. The customer ID field shows the identifier of a customer who operates the system that generated the event. The equipment ID field shows the identifier of a server that generated the event. The time field indicates when the event occurred, and the event type field shows what kind of event it was (e.g., error, warning). The error number/message field gives an identifier representing the content of the event. The event pattern ID field contains the identifier of an event pattern that is chosen as being relevant to the event group. The "number of duplicate event IDs" field gives the number of event patterns that are detected. The matching result field shows the specifics of a countermeasure record corresponding to the detected event pattern.

Pattern Matching (Details)

Figure 24:
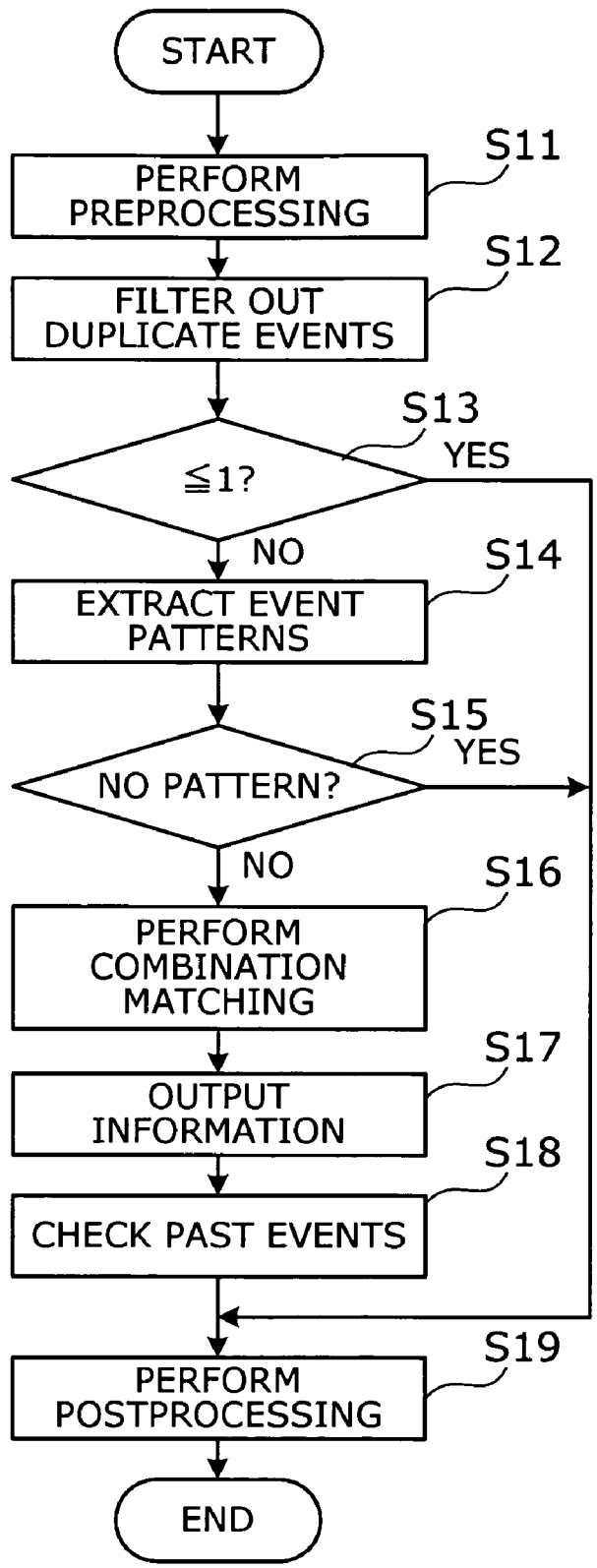
FIG. 24 is a flowchart of a pattern matching process.

The following will explain a pattern matching process in greater detail. FIG. 24 is a flowchart of a pattern matching process. This process includes the following steps:

(Step S11) The pattern matching engine 110 performs preprocessing, which includes, for example, creation of a work table in the RAM 102.

(Step S12) The pattern matching engine 110 selects one event group from among the event groups 121 and performs duplicate event filtering. Here the term "duplicate event filtering" refers to a process of extracting identical event records produced by the same server and sorting out duplicate ones.

(Step S13) The pattern matching engine 110 examines the number of event records included in the selected event group. If there is one or none, the process skips to step S19 since such an event group is not within the scope of the present matching process, which attempts to identify a problem based on the occurrence pattern of multiple event records. If the event group has two or more records, the process advances to step S14.

(Step S14) The pattern matching engine 110 scans the temporary event pattern database 125 to extract event patterns for a subsequent combination matching.

(Step S15) The pattern matching engine 110 determines whether at least one event pattern has been extracted. If there is no pattern to extract, the process skips to step S19. If at least one event pattern is found, the process advances to step S16.

(Step S16) The pattern matching engine 110 performs combination matching. More specifically, it starts an exhaustive comparison between two sets of event records. One is a sorted set of event records in the given event group, and the other is a set of event records belonging to the event patterns extracted from the temporary event pattern database 125.

(Step S17) The pattern matching engine 110 outputs the result of the above matching process. For example, it outputs the matching result for display on a monitor screen of the operation management server 100.

(Step S18) The pattern matching engine 110 checks past events. More specifically, the pattern matching engine 110 consults the monthly event log 152 to see whether there is an identical event log entry. If such an event log entry is found, the pattern matching engine 110 appends that event to the result file.

(Step S19) The pattern matching engine 110 performs postprocessing. That is, the pattern matching engine 110 stores the matching result in both the daily event log 151 and monthly event log 152.

The following will now provide details of each step of FIG. 24.

Figure 25:
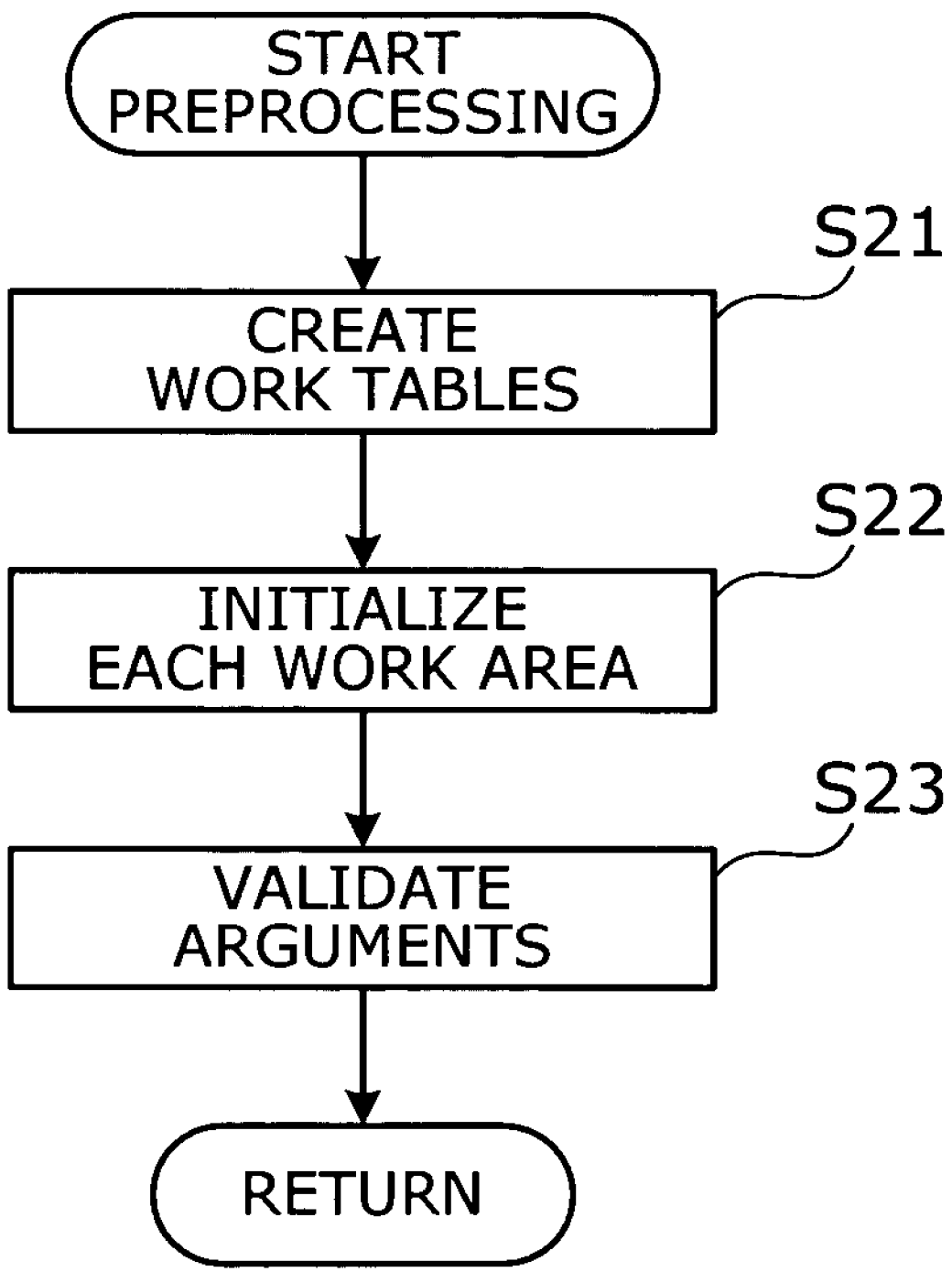
FIG. 25 is a flowchart showing details of preprocessing.

FIG. 25 is a flowchart showing the details of preprocessing. This process includes the following steps:

(Step S21) The pattern matching engine 110 creates new work tables. For example, work tables for the daily event group log 153 and daily event log 151 are created.

(Step S22) The pattern matching engine 110 initializes work areas.

(Step S23) The pattern matching engine 110 validates given arguments. More specifically, it determines whether valid inputs are given for "event group ID" and "destination folder." If either item lacks a valid input, the pattern matching engine 110 generates an error and then returns the control to the main routine of FIG. 24.

Figure 26:
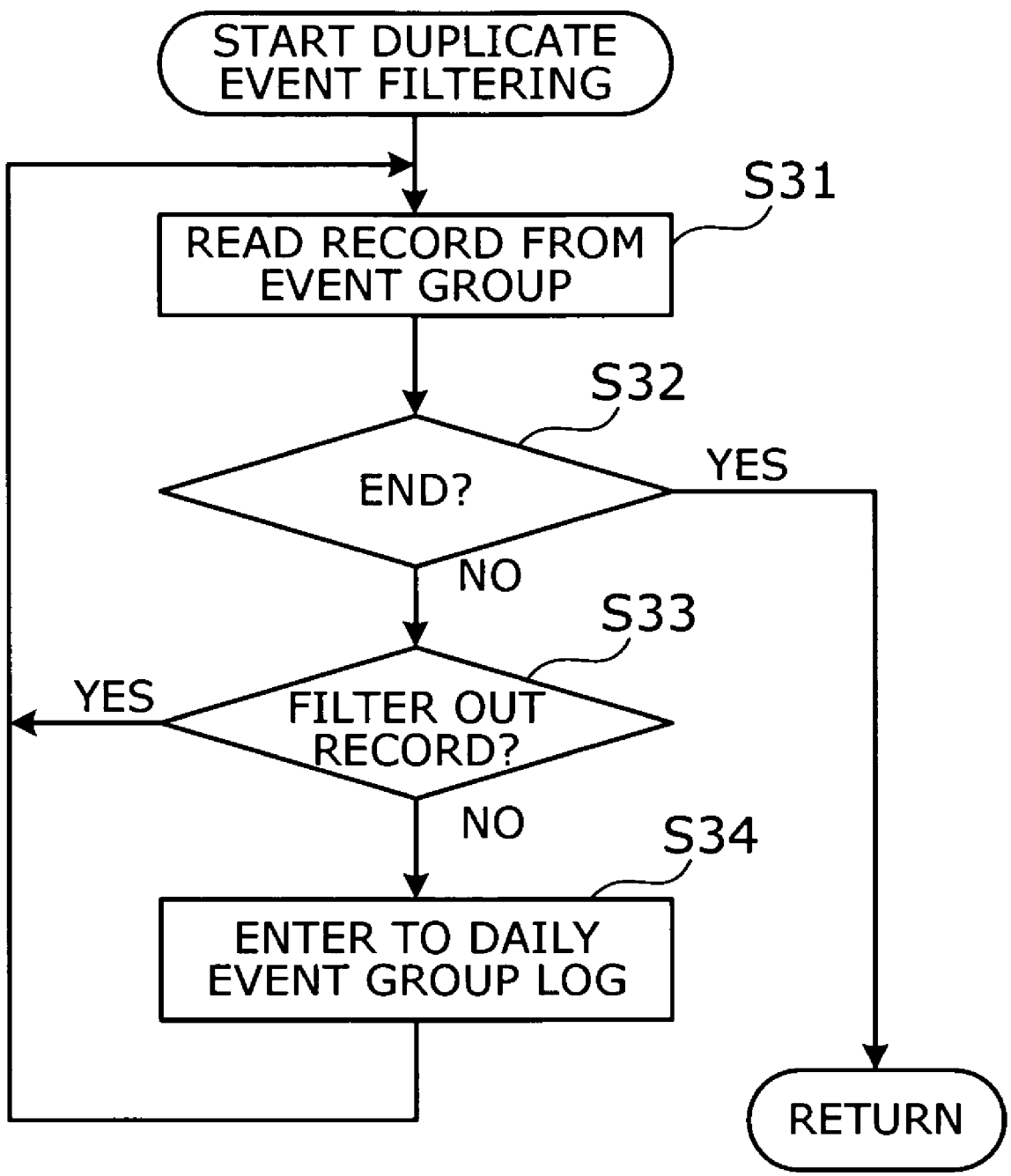
FIG. 26 is a flowchart showing a process of filtering out duplicate events.

The following will describe the duplicate event filtering process. Referring to the flowchart of FIG. 26, the duplicate event filtering process includes the following steps:

(Step S31) The pattern matching engine 110 reads one event record out of a given event group 121. This read operation is performed, for example, in the following order of items: customer ID, equipment ID, and error number/message.

(Step S32) The pattern matching engine 110 determines whether the read operation has been successfully made. If an event group record has been read, the process advances to step S33. If there is no record to read, the process returns to the main routine of FIG. 24.

(Step S33) The pattern matching engine 110 determines whether to filter out the record. Specifically, the record has to be filtered out when the present record has the same field values of equipment type and error number/message as those of the preceding record. If this is the case, the process proceeds to step S31. If there is no need for filtering, the process advances to step S34.

(Step S34) The pattern matching engine 110 stores the survived event group record into the daily event group log (work table) 153. The process then returns to step S31.

Figure 27:
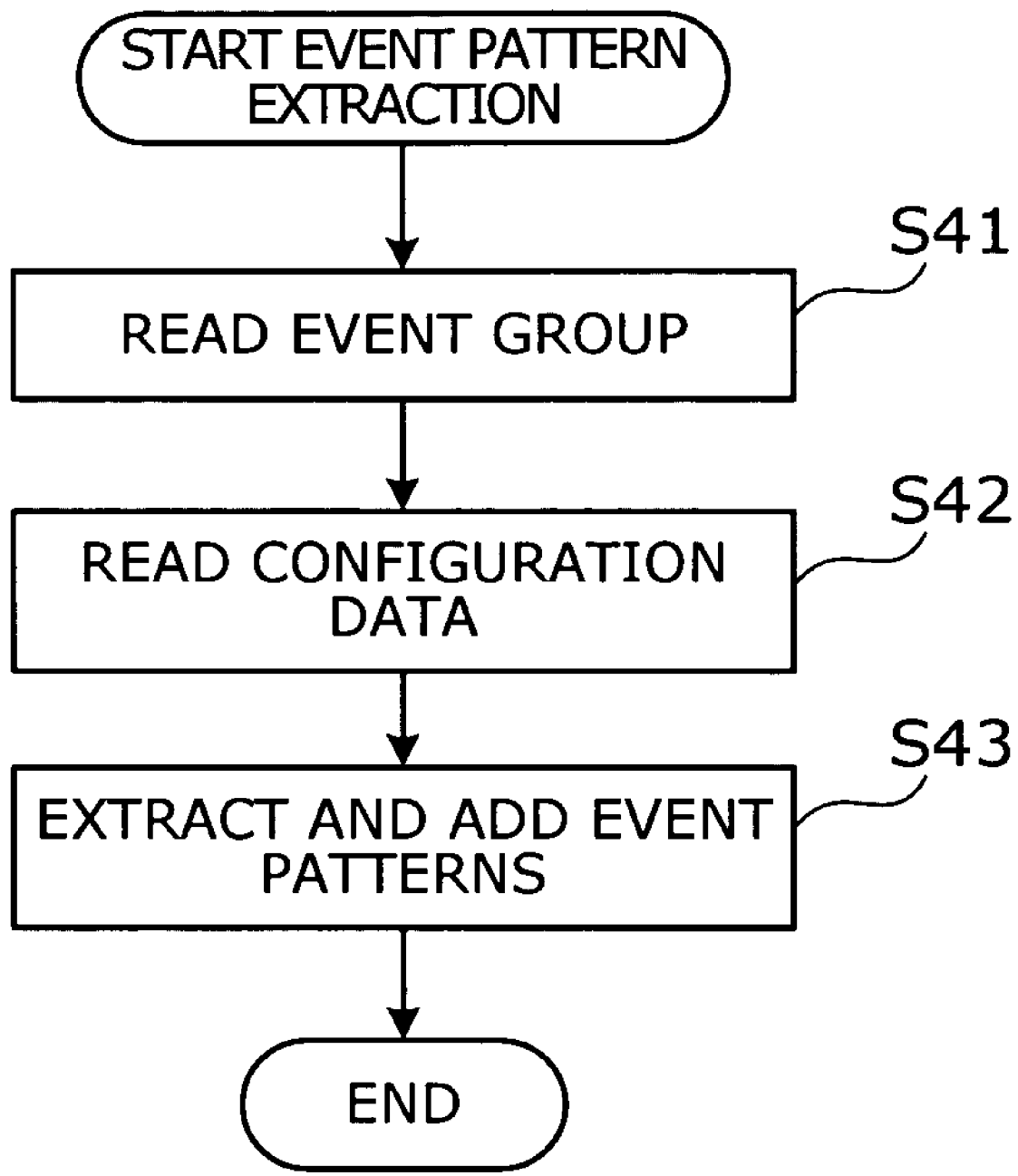
FIG. 27 is a flowchart of an event pattern extraction process.

The following will explain the event pattern extraction process in greater detail. Referring to the flowchart of FIG. 27, the event pattern extraction process includes the following steps:

(Step S41) The pattern matching engine 110 requests the data extractor 130 to extract event patterns. The data extractor 130 then reads an event group out of the daily event group log 153. Data items read out in this operation are in the following order: customer ID, equipment ID, and error number/message. If the read operation is successful, then the data extractor 130 will execute the subsequent steps. If the read has failed (i.e., there is no event group to read), the process returns the main routine of FIG. 24.

(Step S42) The data extractor 130 reads configuration data from the miscellaneous configuration database 123. Specifically, the pattern matching engine 110 searches the miscellaneous configuration database 123 to retrieve a short name that is relevant to the customer ID and equipment ID in the record obtained at step S41.

(Step S43) The data extractor 130 extracts and adds event patterns. Specifically, the data extractor 130 searches the event pattern database 124 to retrieve event patterns that are relevant to each short name retrieved at step S42. The data extractor 130 then adds the retrieved records to the temporary event pattern database 125. The process then returns to the main routine of FIG. 24.

Figure 28:
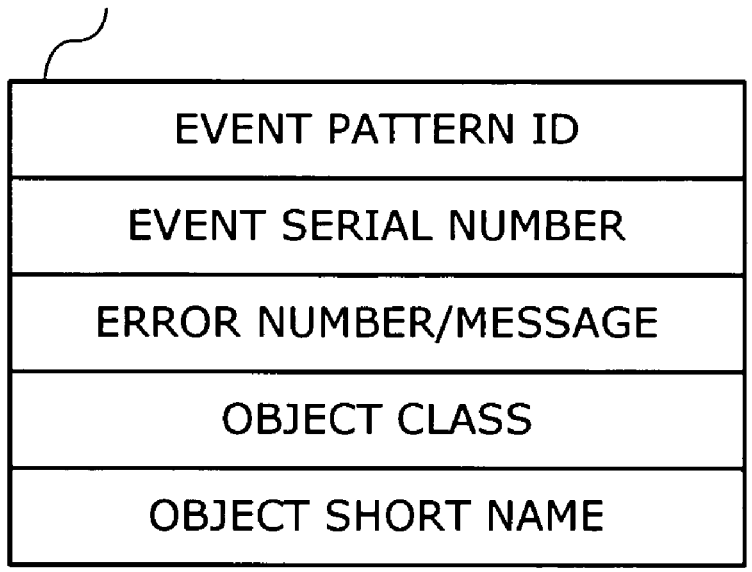
FIG. 28 shows an example data structure of a temporary event pattern database.

FIG. 28 shows an example data structure of a temporary event pattern database. The temporary event pattern database 125 has, among others, the following data fields: "Event Pattern ID," "Event Serial Number," "Error Number/Message," "Object Type," and "Object Short Name."

The event pattern ID field shows the identification code of an event pattern. The event serial number field gives a serial number assigned to that event pattern. The error number/message field gives identifier that represents the content of the problem. The object type field shows the category to which the target object belongs. The object short name field shows an abbreviated name of the target object.

Figure 29:
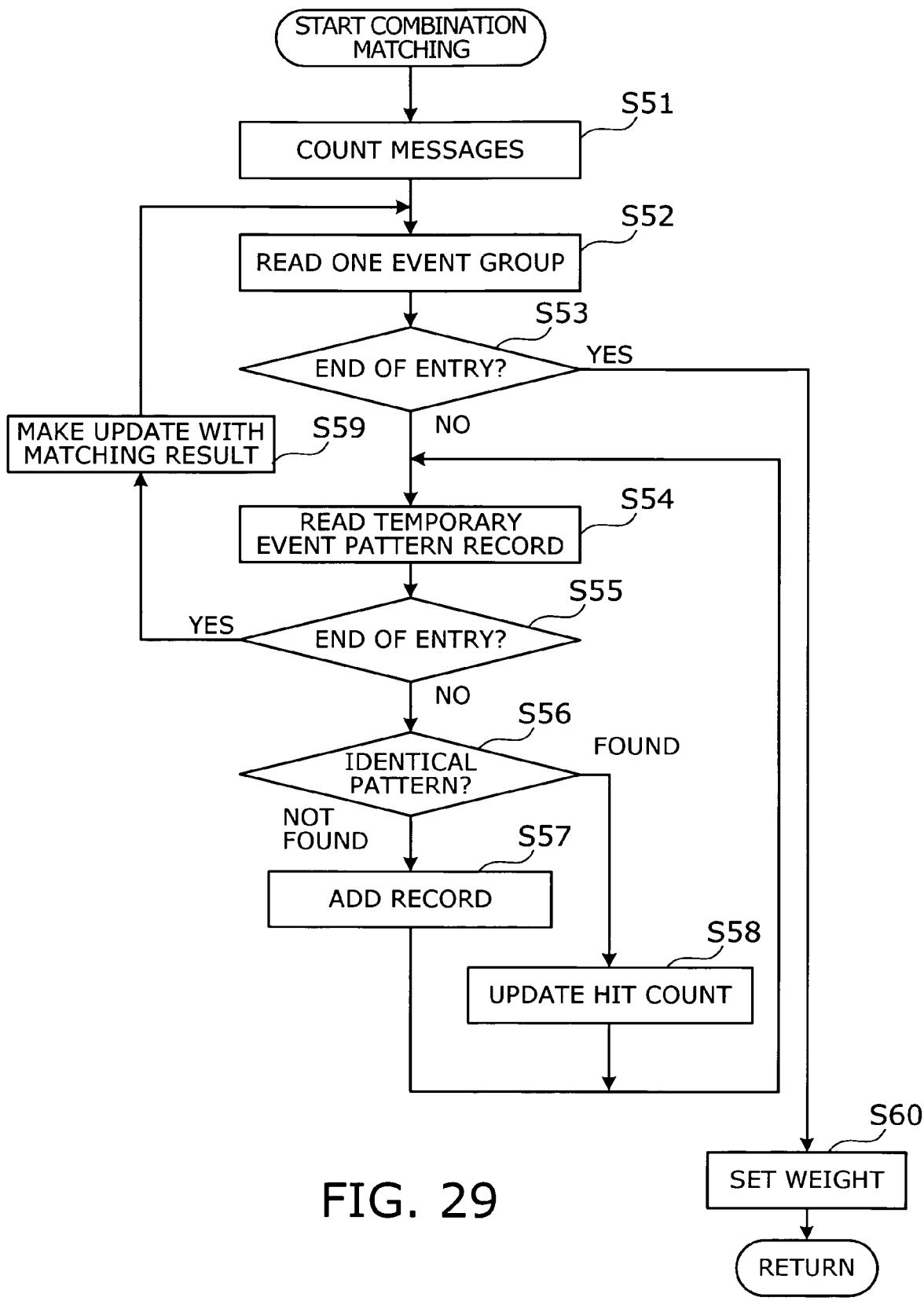
FIG. 29 is a flowchart of a combination matching process.

The following will explain the combination matching process in greater detail. Referring to the flowchart of FIG. 29, the combination matching process includes the following steps:

(Step S51) The pattern matching engine 110 counts the messages of each event group in the daily event group log 153.

(Step S52) The pattern matching engine 110 reads an unfinished event group out of the daily event group log 153. If all event groups have been finished, then a message signifying the end of entry is returned.

(Step S53) The pattern matching engine 110 determines whether an event group has been read. If so, the process advances to step S54. If it has reached the end of entry, the process proceeds to step S60.

(Step S54) The pattern matching engine 110 retrieves event records of an event pattern from the temporary event pattern database 125. If all event patterns have been finished, then a message signifying the end of entry is returned.

(Step S55) The pattern matching engine 110 determines whether event records of an event pattern has been read. If so, the process advances to step S56. If it has reached the end of entry, the process proceeds to step S59.

(Step S56) The pattern matching engine 110 compares the event group read at step S52 with the event pattern read at step S54 on an individual event record basis, so as to find whether the event group has any event record that is identical to one of those in the event pattern. If such a matching event record is found in the event group, the pattern matching engine 110 then determines whether the event pattern read at step S54 is found in the work memory for the daily event log 151. If the event pattern is not found in the daily event log 151, the process advances to step S57. If the event pattern is found in the daily event log 151, the process advances to step S58.

(Step S57) The pattern matching engine 110 creates a record corresponding to the event pattern retrieved at S54 and stores it in the work memory of the daily event log 151. The process then goes back to step S54.

This new record of the daily event log 151 has "Event Pattern ID" and "Event Serial Number" fields copied from the event pattern read at step S54. It also has "Hit Count" field, which is initialized to one. Yet another field "Event Count" is filled in with the number of event records constituting the retrieved event pattern.

(Step S58) Now that there is an existing daily event log record corresponding to the event pattern retrieved at step S54, the pattern matching engine 110 increments its hit count field value by one, thus updating that record of the daily event log 151. The process then goes back to step S54.

(Step S59) The pattern matching engine 110 advances the process to step S52 after making an update with the pattern matching result. More Specifically, the pattern matching engine 110 enters several items to the work table of the daily event group log 153 by copying the following field values from the event group read at step S52: event group ID, event serial number, event ID, customer ID, equipment ID, occurrence time, source class, and error number/message. For the matching result field, however, the pattern matching engine 110 creates and enters a flag indicating whether the matching process has found an event pattern with identical event records.

(Step S60) The pattern matching engine 110 assigns a weight to each record of the work table of the daily event log 151. Specifically, the weight is assigned the number of messages in an event group minus hit count when the number of messages in an event group is greater than the hit count. The weight is assigned the hit count minus the number of messages in an event group when the number of messages in an event group is smaller than the hit count. The weight is simply the hit count when the number of messages in an event group equals the hit count.

Figure 30:
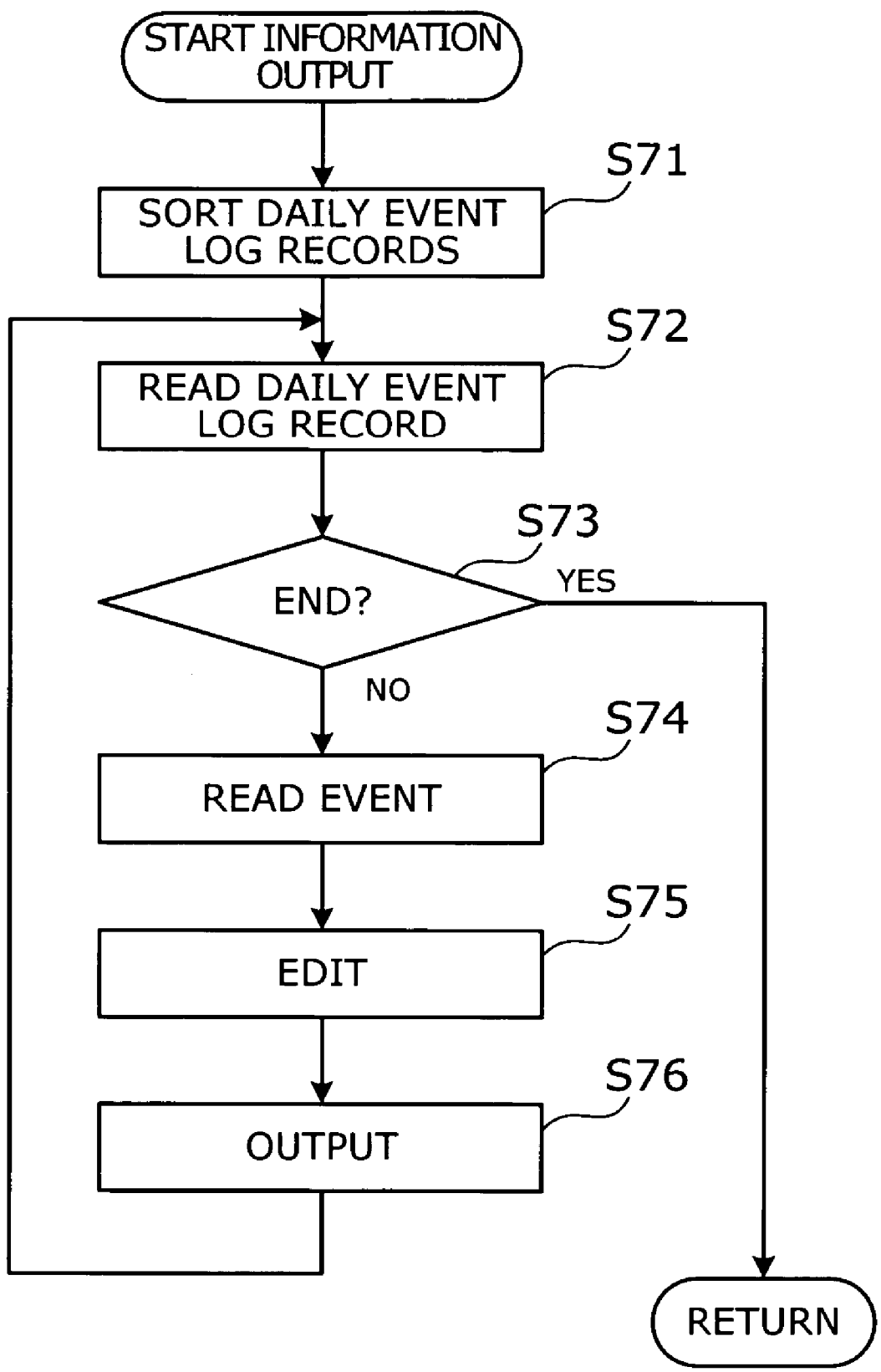
FIG. 30 is a flowchart of a process of outputting information.

The following will describe a process of outputting information. Referring to the flowchart of FIG. 30, the process of outputting information includes the following steps:

(Step S71) The pattern matching engine 110 sorts event log records in the work table of the daily event log 151. This sorting operation involves two sort keys; one is the weight, and the other is the number of identical event records (i.e., the number of event records that are found in both the event group and in each event log record). In the present embodiment, the sorting by weight has higher priority. That is, the pattern matching engine 110 first sorts the event log records according to weights and then, if there are two or more records with the same weight, it sorts them locally by the number of identical event records.

(Step S72) The pattern matching engine 110 reads records of the daily event log 151, one at a time, from the beginning of the sorted array. If there is no event log record to read, then a message is produced to indicate that all records have been read and processed.

(Step S73) The pattern matching engine 110 determines whether all records have been read and processed. If so, the process then returns to the main routine of FIG. 24. If an event log record is read at step S72, the process advances to step S74.

(Step S74) The pattern matching engine 110 reads a countermeasure record corresponding to the event log record.

(Step S75) The pattern matching engine 110 edits the event log record. Specifically, the pattern matching engine 110 first calculates a match ratio as follows: (hit count)/(event record count in event log)×100. Subsequently the pattern matching engine 110 retrieve a record from the daily event log 151 by using the event pattern ID as a search keyword.

Figure 31:
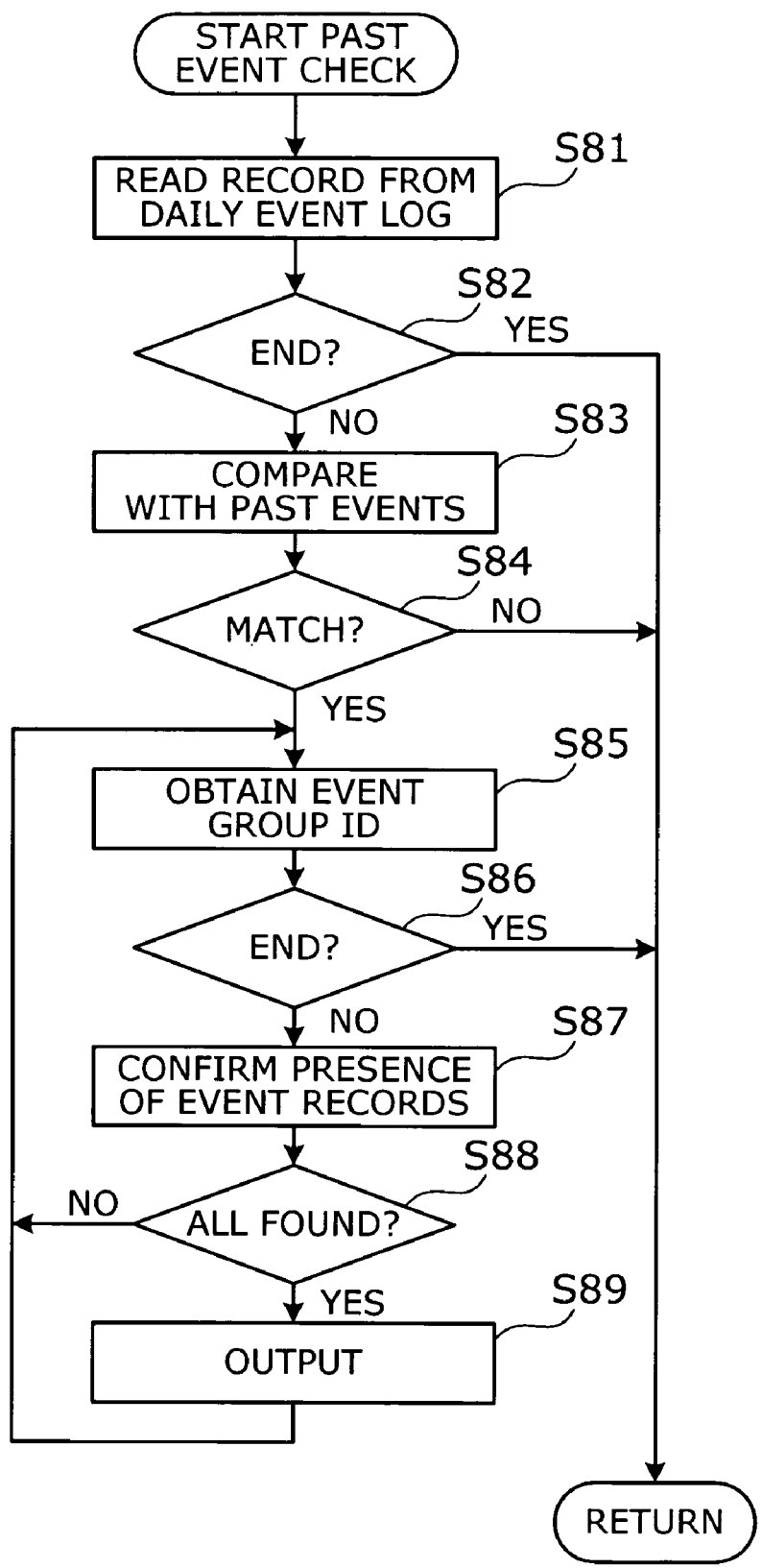
FIG. 31 is a flowchart of a process of checking past events.

(Step S76) The pattern matching engine 110 outputs the match ratio and result to a result file 155. The following will explain a process of checking past events in greater detail. Referring to the flowchart of FIG. 31, the process of checking past events includes the following steps:

(Step S81) The pattern matching engine 110 reads the event ID field value of a record of the daily event log 151. If there is no record to read, then a message is produced to indicate that all records have been read and processed.

(Step S82) The pattern matching engine 110 determines whether all records have been read and processed. If so, the process then returns to the main routine of FIG. 24. If a record is read at step S81, the process advances to step S83.

(Step S83) The pattern matching engine 110 performs matching with past event records. Specifically, it consults the monthly event log 152 to find records identical to the event patterns at hand.

(Step S84) With the matching result of step S83, the pattern matching engine 110 determines whether there is an identical record. If there is, the process advances to step S85. If not, the process returns to the main routine of FIG. 24.

(Step S85) The pattern matching engine 110 looks into the found past event log record to extract its event group ID. This ID shows which event group originated that event log record.

(Step S86) The pattern matching engine 110 determines whether all records obtained at step S85 have been processed. If so, the process returns to the main routine of FIG. 24. If there remains a pending record, the process advances to step S87.

(Step S87) The pattern matching engine 110 compares the event pattern corresponding to the event ID read at step S81 with the event group corresponding to the event group ID obtained at step S85, so as to determine whether each event record in the event group is found in the event pattern.

(Step S88) The pattern matching engine 110 determines whether all event records in the event group are found at step S87. If so, the process advances to step S89. Otherwise, the process goes back to step S85.

(Step S89) The pattern matching engine 110 outputs a timestamp indicating when the event group ID obtained at step S85 was produced. The process then goes back to step S85.

Figure 32:
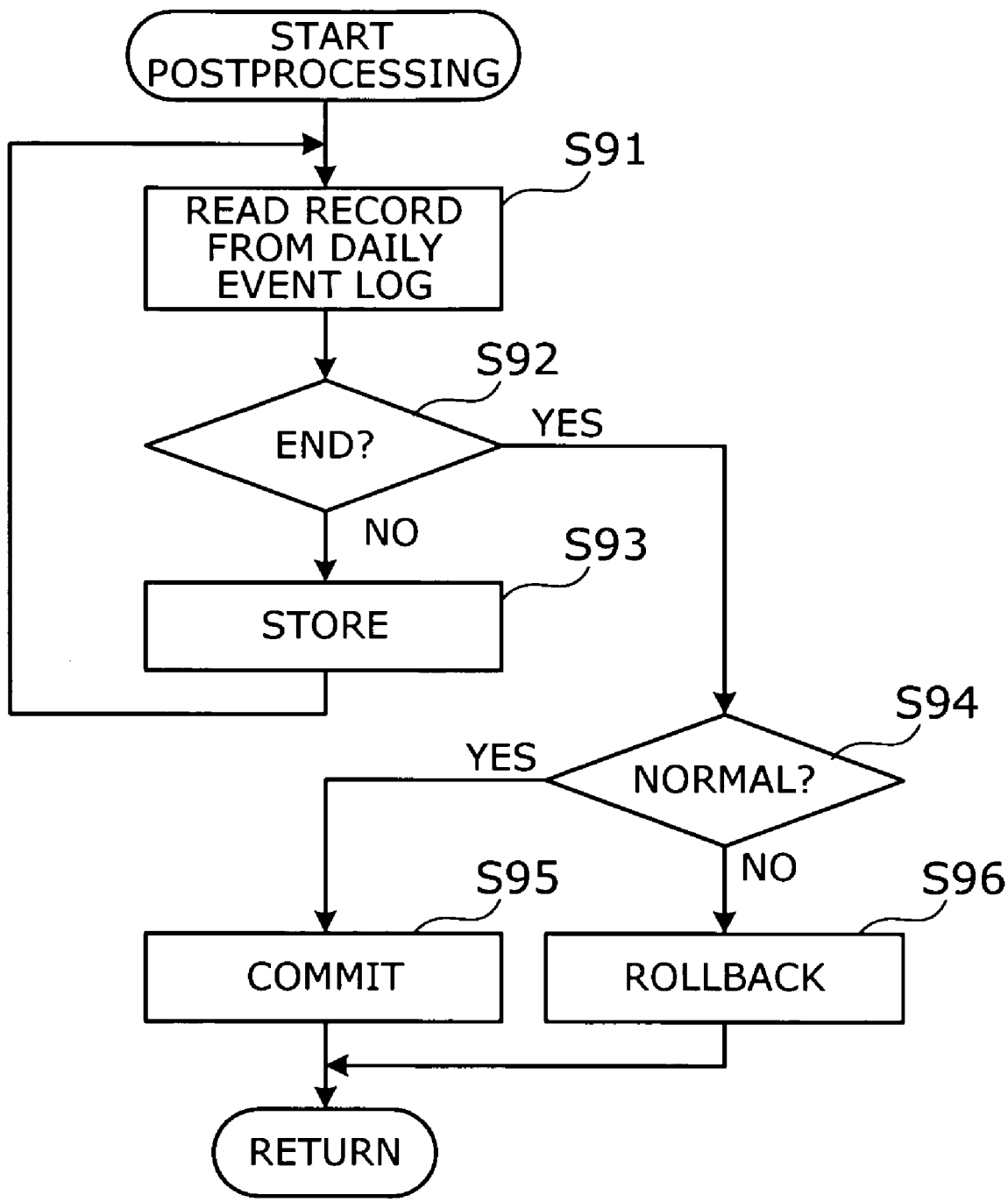
FIG. 32 is a flowchart of a postprocessing sequence.

The following will explain the postprocessing in greater detail. Referring to the flowchart of FIG. 32, the postprocessing sequence includes the following steps:

(Step S91) The pattern matching engine 110 reads a record from the daily event log 151.

(Step S92) The pattern matching engine 110 determines whether all records have been read and processed. If so, the process proceeds to step S94. If not, the process advances to step S93.

(Step S93) The pattern matching engine 110 stores the record read out of the work table of the daily event log 151 into the HDD or the like, as well as appending it to the monthly event log 152. Also, the pattern matching engine 110 stores the work table of the daily event group log 153 (which is a source of the daily event log 151) into an HDD or the like, as well as appending it to the monthly event group log 154. The process then goes back to step S91.

(Step S94) The pattern matching engine 110 determines whether event log records have been stored correctly. If so, the process advances to step S95. Otherwise, the process proceeds to step S96.

(Step S95) The pattern matching engine 110 commits the record storing session and exits from the present process.

(Step S96) The pattern matching engine 110 performs a rollback. The term "rollback" refers to an operation of bringing a database back to the state at a previously established checkpoint to recover from a failure. After rollback, the pattern matching engine 110 exits from the present process.

Figure 33:
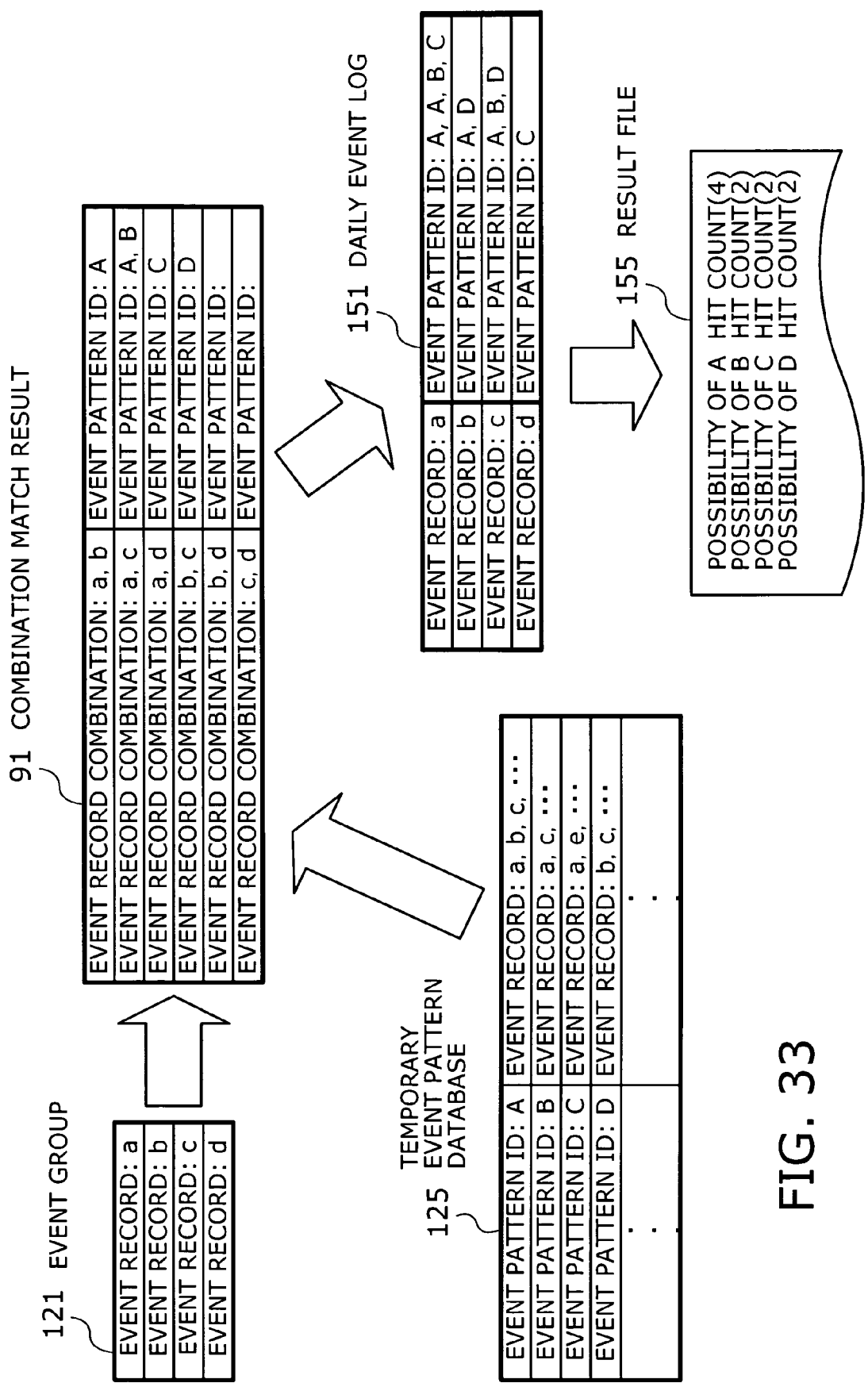
FIG. 33 shows a flow of information.

FIG. 33 shows a flow of information. In the example of FIG. 33, a given event group 121 includes four event records with IDs of "a," "b," "c," and "d. The temporary event pattern database 125 stores a plurality of event patterns. Those event patterns are referred to by their event pattern IDs of "A," "B," "C," "D," and so on. Event pattern "A" consists of event records "a," "b," "c," and others. Event pattern "B" consists of event records "a," "c," and others. Event pattern "C" consists of event records "a," "e," and others. Event pattern "D" consists of event records "b," "c," and others.

A pattern matching process takes place with the above event group 121 and event patterns stored in the temporary event pattern database 125, thus yielding a combination match result 91 shown in FIG. 33. For simplicity, the example of FIG. 33 only shows matching results for combinations of two event records.

Referring to this combination match result 91, event pattern "A" is extracted as a matching event pattern for a combination of event records "a" and "b." Event patterns "A" and "B" are extracted as matching event patterns for a combination of event records "a" and "c." Event pattern "C" is extracted as a matching event pattern for a combination of event records "a" and "d." Event pattern "D" is extracted as a matching event pattern for a combination of event records "b" and "c." No event pattern is extracted, however, for a combination of event records "b" and "d," nor for a combination of event records "c" and "d."

Based on the above combination match result 91, a daily event log 151 is produced. Associated with event record "a" are event pattern IDs "A," "A," "B," and "C". Likewise, event record "b" is associated with event pattern IDs "A" and "D". Event record "c" is associated with event pattern IDs "A," "B," and "D". Event record "d" is associated only with an event pattern ID "C."

The daily event log 151 is used to produce a result file 155. The result file 155 in the example of FIG. 33 gives a list of event patterns arranged together with their respective hit counts in the descending order of likeliness of being a cause of the problem. In FIG. 33, event pattern "A" has a hit count of "4." Event pattern "B" has a hit count of "2," and so do the remaining event patterns "C" and "D." While the example result file 155 shown in FIG. 33 gives hit counts, it may also be configured to show match ratios.

The details of pattern matching have been explained. As can be seen from the above, the operation management server 100 extracts one or more highly probable causes of an event by combining interrelated event records into an event group 121 and comparing them with event patterns. Its pattern matching engine 110 provides the administrator with a result file for tips about possible causes of a problem and their countermeasures.

Event Search Function

In the above explanation, the operation management server 100 collects event messages directly from the system and automatically sorts event records into groups for analysis. However, it is also possible for the operation management server 100 to analyze a specified set of event records. In this case, one can specify an event group by selecting desired records through, for example, an event group search screen.

FIG. 34 shows an example of an event group search screen. This event group search screen 510 permits the user to create a desired event group for the purpose of matching, by retrieving past log records from a database that contains past event group log records collected within a predetermined period.

The illustrated event group search screen 510 has a message search condition entry section 511 and an event search condition entry section 512. The message search condition entry section 511 accepts entry of a customer name and a period as search conditions. Specifying a customer name means specifying a particular system that produced messages containing event records. The operation management server 100 retrieves event groups matching with what is entered to the message search condition entry section 511.

The event search condition entry section 512 includes input boxes for specifying a cause and a countermeasure. Each input box has a check box. The entered text is enabled as a search keyword when the corresponding check box is selected. The operation management server 100 searches event group log records, based on what is entered to the event search condition entry section 512.

The event group search screen 510 enables an event group to be retrieved and presented on a display screen. For pattern matching, the user is allowed choose a particular event record from among those belonging to the retrieved event group. The selected event record is subjected to an analysis to find the cause of a problem and its countermeasure.

FIG. 35 shows an example of an event selection screen. The event selection screen 520 shows a list of event records belonging to an event group log record extracted through a search or the like. The user chooses a part 521 of the event record list. The selected event records can be treated as a single event group to analyze the cause of a problem. The event group specified in this way is analyzed through a series of processes, the outcome of which is output as a result file 155 and displayed on an analysis result screen.

FIG. 36 shows an example of an analysis result screen. This analysis result screen 530 has a selected message section 531, a search condition section 532, and an event message section 533. The selected message section 531 shows the specifics of event records of the selected event group. The search condition section 532 gives a list of causes and countermeasures suggested by the relevant event patterns. The event message section 533 shows the content of event records defined in an event pattern.

Another Application

In the embodiments described above, problems are investigated on the basis of error events that servers would produce. As another method, operator commands can also be a source of information for analyzing a problem. In other words, the alternative approach is to locate a problem from inputs which could cause that problem, whereas the foregoing embodiments try to locate a problem from events resulting from the problem source. Actually, some users experience a conflict between two programs depending on their computer environments; that is, some active application process can hamper another process, which can normally be executed independently. In such cases, a history of commands issued for those processes would enable the operation management server to automatically isolate the problem.

For example, a database denies access from outside when it is in the process of data backup. In this case, conventional systems produce a database access error. The user, however, is unable to know the reason for their inability to make access to the database. To notify the users that they are attempting to do what their system does not allow, the system can be designed to collect pattern definition groups of command sets for later pattern matching. Each group contains a plurality of commands that cannot be executed concurrently, and when such a command set is entered by a user, the system will search the collected command set patterns and provide the user with the information about the problem, including its cause and countermeasure. For example, the system may suggest him/her stopping an application that causes a problem.

When a plurality of applications are running concurrently, one application may encounter an error in an attempt to do something that another application does not allow. Generally, in such cases, the user is not allowed to modify the application program that is violating restrictions. The user, however, will be able to avoid the problem if the system can detect an operator input that requests concurrent execution of applications and would end up with an error, and if it can provide an alternative way for him/her to get what he/she wants, without producing errors.

The above-described processing mechanism can be implemented on a platform similar to what has been described in FIG. 11. Servers or other terminal stations, however, have to be configured to send messages to the operation management server 100 to show what instructions users have entered. The operation management server 100 stores those messages in a history table. In addition, the operation management server 100 has an operation pattern database to store various operation patterns that would lead to a problem.

Figure 37:
FIG. 37 shows an example data structure of a history table.

FIG. 37 shows an example data structure of a history table. For each message received, this history table 610 has the following data fields: "Occurrence Time," "Command Name," and "Server Name." The occurrence time field shows when the operation management server 100 received a message delivering a record of operator input. The command name field shows a command that was actually issued. The server name field shows the name of a server that transmitted the message. What are entered to the history table 610 are records of operator input during a predetermined time period (e.g., ten minutes from 1:30 p.m.).

FIG. 38 shows an example data structure of an operation pattern database. This operation pattern database 620 has the following data fields: "Operation Pattern Code," "Operation Pattern," "Symptom," "Cause," and "Countermeasure."

The operation pattern code field gives an identification code assigned to each operation pattern. The operation pattern field shows a set of commands that could cause a problem. The symptom field shows how the problem would appear, and the cause field shows the cause of that problem. The countermeasure field tells what action to be taken to circumvent the problem.

See the history table 610 of FIG. 37, for example. The records indicate that a user invoked an editor program with a "vi" command, edited a "hosts" file, and then started a mailer program with a "mail" command. Suppose that this sequence of operator commands has brought an error. The user then receives an analysis report from the operation management server 100 concerning the error. The above sequence of operator commands matches with the operation pattern with a code of "s00000002" stored in the operation pattern database 620. Accordingly, the operation management server 100 retrieves this operation pattern record and sends a message to the user's terminal station, so that the information in the "Symptom," "Cause," and "Countermeasure" fields will be displayed. The user then checks what is actually happening, and if it is exactly what the message says, then he/she understands that the current situation is known as the operation pattern code "s00000002." The suggested cause and countermeasure will help the user to solve his/her problem.

Program Storage Media

The above-described processing functions are implemented on a computer system. Instructions describing the functions of an operation management server are encoded and provided in the form of computer programs. The computer system executes those programs to provide the intended processing functions of the present invention. The programs can be stored in a computer-readable storage medium. Such storage media include magnetic storage devices, optical discs, magneto-optical storage media, and solid state memory devices. Magnetic storage devices include hard disk drives (HDD), flexible disks (FD), and magnetic tapes. Optical discs include digital versatile discs (DVD), DVD-Random access memory (DVD-RAM), compact disc read-only memory (CD-ROM), CD-Recordable (CD-R), and CD-Rewritable (CD-RW). Magneto-optical storage media include magneto-optical discs (MO).

Portable storage media, such as DVD and CD-ROM, are suitable for distribution of program products. Network-based distribution of software programs is also possible, in which master program files are made available in a server computer for downloading to other computers via a network.

A user computer stores necessary programs in its local storage unit, which have previously been installed from a portable storage media or downloaded from a server computer. The computer executes the programs read out of the local storage unit, thereby performing the programmed functions. As an alternative way of program execution, the computer may execute programs, reading out program codes directly from a portable storage medium. Another alternative method is that the user computer dynamically downloads programs from a server computer when they are demanded and executes them upon delivery.

CONCLUSION

The above discussion is summarized as follows. According to the present invention, the operation management server is designed to collect event records from target objects in other servers being monitored and sorts them into groups. The resulting event group is compared with pattern definition groups to find a matching pattern definition group, and a countermeasure record corresponding to that group is extracted. The proposed feature of the invention makes it easy to identify a target object that is causing a problem.

The foregoing is considered as illustrative only of the principles of the present invention. Further, since numerous modifications and changes will readily occur to those skilled in the art, it is not desired to limit the invention to the exact construction and application programs shown and described, and accordingly, all suitable modifications and equivalents may be regarded as falling within the scope of the invention in the appended claims and their equivalents.

What is claimed is:

1. An operation management method for managing a server, comprising:
    collecting event records from a plurality of target objects being monitored, the target objects being a plurality of functions executed on the server;
    grouping a plurality of collected event records into an event group;
    providing a database storing a plurality of pattern definition groups, each defining a pattern of a plurality of event records that would be produced by the target objects upon occurrence of a particular problem;
    comparing the event records in the event group with those of each pattern definition group stored in the database to obtain a match count and a mismatch count for each pattern definition group, wherein the match count is obtained by counting matching event records, and wherein the mismatch count is obtained by counting missing event records in a pattern definition group when the event group contains more event records than the pattern definition group being compared or by counting mismatched event records when the event group contains fewer event records than the pattern definition group being compared;
    sorting the pattern definition groups in descending order of match counts thereof;

sorting locally the pattern definition groups with equal match counts in ascending order of mismatch counts thereof, thereby producing sorted pattern definition groups; and extracting a troubleshooting record that has previously been associated with the first one of the sorted pattern definition groups, the troubleshooting record indicating which target object is considered a source of a problem.

2. The operation management method according to claim 1, wherein the event records are collected from a plurality of servers.

3. The operation management method according to claim 1, wherein the collected event records have different formats depending of the target objects, and said collecting converts the different formats of the collected event records into a unified data format.

4. The operation management method according to claim 1, wherein said event group combines event records produced from interrelated target objects by consulting a database that defines relationships between the plurality of target objects.

5. The operation management method according to claim 1, wherein said event group combines event records collected in a predetermined period.

6. The operation management method according to claim 1, wherein the troubleshooting record includes information about the cause of the problem, as well as countermeasure information that suggests how to solve the problem.

7. An operation management method for managing a server, comprising:

collecting records of commands entered to the server;

grouping a plurality of collected command records into an operation log;

providing a database storing a plurality of operation patterns each defining a pattern of a plurality of commands that could lead to a problem;

comparing the command records in the operation log with those of each operation pattern stored in the database to obtain a match count and a mismatch count for each operation pattern, wherein the match count is obtained by counting matching command records, and wherein the mismatch count is obtained by counting missing command records in an operation pattern when the operation log contains more command records than the operation pattern being compared or by counting mismatched command records when the operation log contains fewer command records than the operation pattern being compared;

sorting the operation patterns in descending order of match counts thereof;

sorting locally the operation patterns with equal match counts in ascending order of mismatch counts thereof, thereby producing sorted operation patterns; and extracting a troubleshooting record that has previously been associated with the first one of the sorted operation patterns, the troubleshooting record indicating which target object is considered a source of a problem.

8. An operation management device for managing a server, comprising:

collecting means for collecting event records from a plurality of target objects being monitored, the target objects being a plurality of functions executed on the server;

grouping means for grouping a plurality of collected event records into an event group;

a database storing a plurality of pattern definition groups each defining a pattern of a plurality of event records that would be produced by the target objects upon occurrence of a particular problem;

comparing means for comparing the event records in the event group with those of each pattern definition group stored in the database to obtain a match count and a mismatch count for each pattern definition group, wherein the match count is obtained by counting matching event records, and wherein the mismatch count is obtained by counting missing event records in a pattern definition group when the event group contains more event records than the pattern definition group being compared or by counting mismatched event records when the event group contains fewer event records than the pattern definition group being compared;

first sorting means for sorting the pattern definition groups in descending order of match counts thereof;

second sorting means for sorting locally the pattern definition groups with equal match counts in ascending order of mismatch counts thereof, thereby producing sorted pattern definition groups; and extracting means for extracting a troubleshooting record that has previously been associated with the first one of the sorted pattern definition group, the troubleshooting record indicating which target object is considered a source of a problem.

9. An operation management device for managing a server, comprising:

collecting means for collecting records of commands entered to the server;

grouping means for grouping a plurality of collected command records into an operation log;

a database storing a plurality of operation patterns each defining a pattern of a plurality of commands that could lead to a problem;

comparing means for comparing the command records in the operation log with those of each operation pattern stored in the database to obtain a match count and a mismatch count for each operation pattern, wherein the match count is obtained by counting matching command records, and wherein the mismatch count is obtained by counting missing command records in an operation pattern when the operation log contains more command records than the operation pattern being compared or by counting mismatched command records when the operation log contains fewer command records than the operation pattern being compared;

first sorting means for sorting the operation patterns in descending order of match counts thereof;

second sorting means for sorting locally the operation patterns with equal match counts in ascending order of mismatch counts thereof, thereby producing sorted operation patterns; and extracting means for extracting a troubleshooting record that has previously been associated with the first one of the sorted operation patterns, the troubleshooting record indicating which target object is considered a source of a problem.

10. A computer-readable storage medium storing an operation management program for managing a server, the program causing a computer to perform operations comprising:

collecting event records from a plurality of target objects being monitored, the target objects being a plurality of functions executed on the server;

grouping a plurality of collected event records into an event group;

providing a database storing a plurality of pattern definition groups each defining a pattern of a plurality of event records that would be produced by the target objects upon occurrence of a particular problem;

comparing the event records in the event group with those of each pattern definition group stored in the database to obtain a match count and a mismatch count for each pattern definition group, wherein the match count is obtained by counting matching event records, and wherein the mismatch count is obtained by counting missing event records in a pattern definition group when the event group contains more event records than the pattern definition group being compared or by counting mismatched event records when the event group contains fewer event records than the pattern definition group being compared;

sorting the pattern definition groups in descending order of match counts thereof;

sorting locally the pattern definition groups with equal match counts in ascending order of mismatch counts thereof, thereby producing sorted pattern definition groups; and extracting a troubleshooting record that has previously been associated with the first one of the sorted pattern definition groups, the troubleshooting record indicating which target object is considered a source of a problem.

11. A computer-readable storage medium storing an operation management program for managing a server, the program causing a computer to perform operations comprising:

collecting records of commands entered to the server;

grouping a plurality of collected command records into an operation log;

providing a database storing a plurality of operation patterns each defining a pattern of a plurality of commands that could lead to a problem;

comparing the command records in the operation log with those of each operation pattern stored in the database to obtain a match count and a mismatch count for each operation pattern, wherein the match count is obtained by counting matching command records, and wherein the mismatch count is obtained by counting missing command records in an operation pattern when the operation log contains more command records than the operation pattern being compared or by counting mismatched command records when the operation log contains fewer command records than the operation pattern being compared;

sorting the operation patterns in descending order of match counts thereof;

sorting locally the operation patterns with equal match counts in ascending order of mismatch counts thereof, thereby producing sorted operation patterns; and extracting a troubleshooting record that has previously been associated with the first one of the sorted operation patterns, the troubleshooting record indicating which target object is considered a source of a problem.

* * * * *